(12) United States Patent
McCarthy, Jr. et al.

(10) Patent No.: US 10,619,525 B2
(45) Date of Patent: Apr. 14, 2020

(54) CYLINDER DEACTIVATION HYDRAULIC LASH ADJUSTER

(71) Applicant: EATON INTELLIGENT POWER LIMITED, Dublin (IE)

(72) Inventors: James E McCarthy, Jr., Kalamazoo, MI (US); Douglas J Nielsen, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/935,292

(22) Filed: Mar. 26, 2018

(65) Prior Publication Data
US 2018/0230914 A1    Aug. 16, 2018

Related U.S. Application Data

(63) Continuation-in-part of application No. PCT/US2016/053590, filed on Sep. 23, 2016.
(Continued)

(51) Int. Cl.
*F01L 13/00* (2006.01)
*F02D 41/00* (2006.01)
(Continued)

(52) U.S. Cl.
CPC ......... *F01L 13/0005* (2013.01); *F01L 1/2422* (2013.01); *F01L 13/0031* (2013.01);
(Continued)

(58) Field of Classification Search
CPC . F01L 13/0005; F01L 1/2422; F01L 13/0031; F01L 2013/001; F01L 1/146;
(Continued)

(56) References Cited

U.S. PATENT DOCUMENTS 6,196,175 B1 * 3/2001 Church ................ F01L 1/146
123/198 F
6,513,470 B1 * 2/2003 Hendriksma ............ F01L 1/14
123/90.15
(Continued)

FOREIGN PATENT DOCUMENTS

EP          0710841 A2    5/1996
WO      2015031887 A1    3/2015

OTHER PUBLICATIONS

International Search Report and Written Opinion for PCT/US2016/053590, dated Dec. 29, 2016; pp. 1-15.

*Primary Examiner* — Patrick Hamo
*Assistant Examiner* — Wesley G Harris
(74) *Attorney, Agent, or Firm* — Mei & Mark, LLP

(57) ABSTRACT

A diesel engine system, comprises a selectively actuated cylinder deactivation mechanism configured to lift and lower a valve and to deactivate actuation of the valve. A sleeve comprises a recesses. A controllable latch is movable between a latched condition to catch the latch in the recesses and an unlatched condition configured to collapse the latch from the recesses. A pushrod is coupled to the sleeve, the pushrod is configured to lift and lower the valve when the latch is in the latched condition. The pushrod is further configured to reciprocate inside the sleeve to deactivate actuation of the valve when the latch is in the unlatched condition.

20 Claims, 27 Drawing Sheets

Related U.S. Application Data

(60) Provisional application No. 62/397,796, filed on Sep. 21, 2016, provisional application No. 62/280,678, filed on Jan. 19, 2016, provisional application No. 62/233,294, filed on Sep. 25, 2015.

(51) Int. Cl.

| | |
|---|---|
| *F02D 41/02* | (2006.01) |
| *F02D 41/22* | (2006.01) |
| *F02D 13/02* | (2006.01) |
| *F02D 13/06* | (2006.01) |
| *F01L 1/24* | (2006.01) |
| *F02D 17/02* | (2006.01) |
| *F02D 41/14* | (2006.01) |
| *F02M 26/05* | (2016.01) |
| *F02D 41/18* | (2006.01) |

(52) U.S. Cl.
CPC ......... *F02D 13/0215* (2013.01); *F02D 13/06* (2013.01); *F02D 17/02* (2013.01); *F02D 41/0007* (2013.01); *F02D 41/0087* (2013.01); *F02D 41/024* (2013.01); *F02D 41/22* (2013.01); *F01L 2013/001* (2013.01); *F01L 2800/12* (2013.01); *F02D 13/0265* (2013.01); *F02D 41/009* (2013.01); *F02D 41/1446* (2013.01); *F02D 41/1458* (2013.01); *F02D 41/18* (2013.01); *F02D 2041/0012* (2013.01); *F02D 2200/0614* (2013.01); *F02D 2200/101* (2013.01); *F02D 2200/1006* (2013.01); *F02M 26/05* (2016.02); *Y02T 10/144* (2013.01); *Y02T 10/18* (2013.01); *Y02T 10/26* (2013.01)

(58) Field of Classification Search
CPC ......... F01L 2105/00; F01L 1/14; F02D 17/02; F02D 13/0215; F02D 41/0087; F02D 13/06; F02D 2041/0012; F02D 41/0007; F02D 41/22; F02D 2200/101; F02D 2200/1006; F02D 2200/0614; F02D 13/0265; Y02T 10/18; Y02T 10/26; Y02T 10/144; F02M 26/05

See application file for complete search history.

(56) References Cited

U.S. PATENT DOCUMENTS

| | | | |
|---|---|---|---|
| 8,122,862 B2* | 2/2012 | Hicks | F01L 1/146 123/90.16 |
| 8,622,036 B2* | 1/2014 | Albertson | F01L 1/146 123/90.12 |
| 9,080,507 B2 | 7/2015 | Gunewardena | |
| 9,157,339 B2 | 10/2015 | Stretch et al. | |
| 9,175,613 B2 | 11/2015 | Parsels et al. | |
| 2002/0046718 A1* | 4/2002 | Spath | F01L 1/146 123/90.15 |
| 2002/0189575 A1 | 12/2002 | Rayl | |
| 2003/0101961 A1 | 6/2003 | Foster | |
| 2004/0098970 A1 | 5/2004 | Foster | |
| 2004/0113731 A1* | 6/2004 | Moyer | H01F 7/1615 335/220 |
| 2005/0188944 A1 | 9/2005 | Mahakul | |
| 2007/0051092 A1 | 3/2007 | Pallett | |
| 2007/0051351 A1 | 3/2007 | Pallett | |
| 2007/0215081 A1 | 9/2007 | Frincke | |
| 2009/0306846 A1 | 12/2009 | Jeong | |
| 2012/0167554 A1 | 7/2012 | Zhang | |
| 2012/0221217 A1 | 8/2012 | Sujan | |
| 2013/0110375 A1 | 5/2013 | Gunewardena | |
| 2014/0039778 A1 | 2/2014 | Kerns et al. | |
| 2014/0053803 A1 | 2/2014 | Rayl | |
| 2014/0069378 A1 | 3/2014 | Burleigh et al. | |
| 2014/0360477 A1 | 12/2014 | Doering et al. | |
| 2015/0075458 A1 | 3/2015 | Parsels et al. | |
| 2015/0152796 A1 | 6/2015 | Zhang | |
| 2015/0192080 A1 | 7/2015 | Younkins et al. | |
| 2015/0252743 A1 | 9/2015 | Glugla | |
| 2016/0010568 A1 | 1/2016 | Whiston et al. | |
| 2016/0169064 A1 | 6/2016 | Radulescu et al. | |
| 2018/0274457 A1 | 9/2018 | McCarthy, Jr. et al. | |
| 2018/0298794 A1 | 10/2018 | McCarthy, Jr. et al. | |

\* cited by examiner

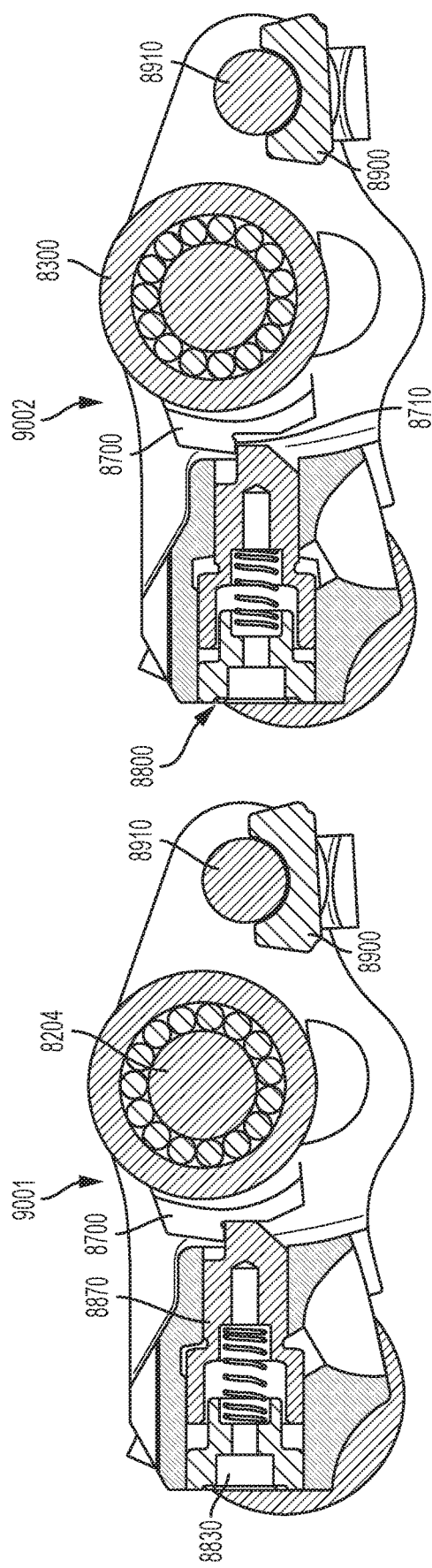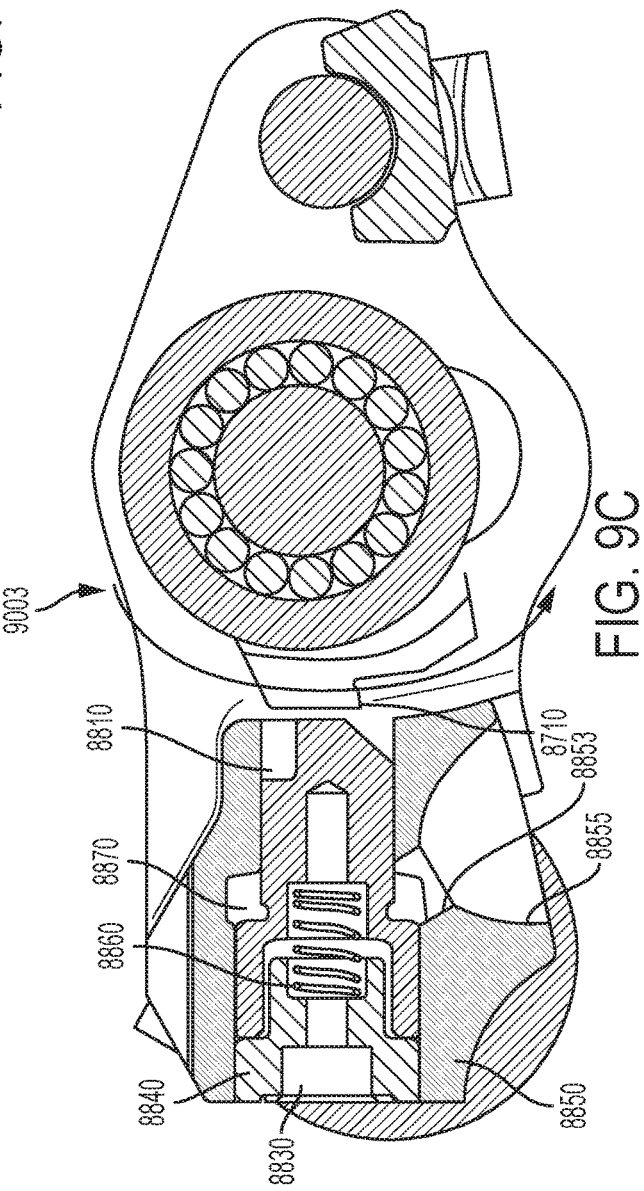

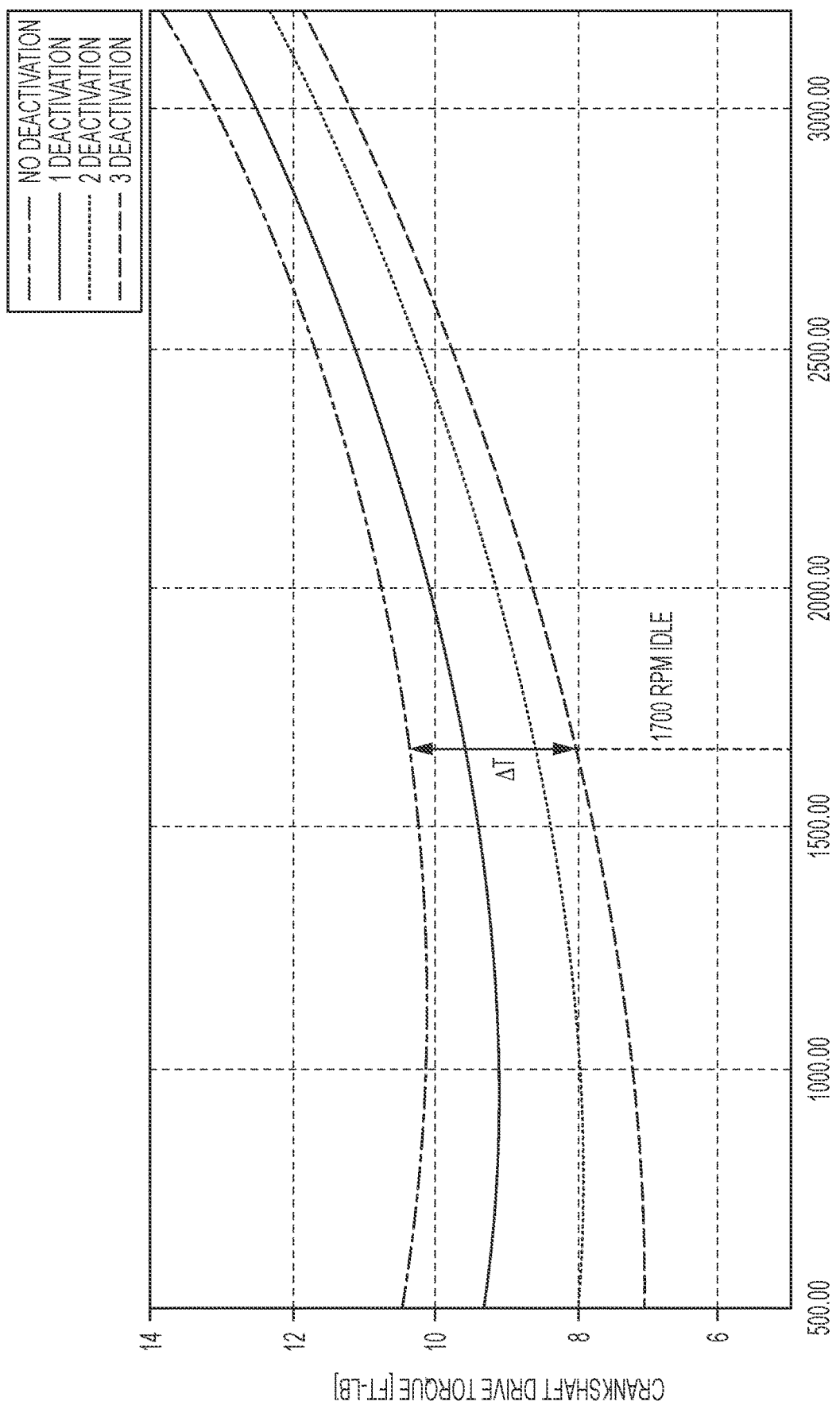

CYLINDER DEACTIVATION HYDRAULIC LASH ADJUSTER

This is a bypass continuation-in-part of International Application No. PCT/US2016/053590, filed Sep. 23, 2016, and claims the benefit of U.S. provisional application No. 62/233,924, filed Sep. 25, 2015, U.S. provisional application No. 62/280,678 filed Jan. 19, 2016, and U.S. provisional application No. 62/397,796 filed Sep. 21, 2016, all of which are incorporated herein by reference.

FIELD

This application provides methods and systems for controlling cylinder deactivation.

BACKGROUND

Vehicles using all six cylinders in all operating conditions suffer from inefficiencies. For example, when stoichiometric air to fuel ratios are required for engine operation, such as in gasoline systems, there are operating conditions where excessive fuel consumption occurs. Full fueling to all cylinders in low load, idle, coast, or ranges of cruise conditions results in overuse of fuel. These low operating conditions do not need optimal engine output.

Likewise, in diesel systems, there are situations where the amount fuel being used is in excess of that necessary to power an engine. It is desirable to reduce fuel consumption.

SUMMARY

The methods disclosed herein overcome the above disadvantages and improves the art by way of systems and methods to reduce fuel consumption and improve engine efficiencies.

A diesel engine system, comprises a selectively actuated cylinder deactivation mechanism configured to lift and lower a valve and to deactivate actuation of the valve. A sleeve comprises a recesses. A controllable latch is movable between a latched condition to catch the latch in the recesses and an unlatched condition configured to collapse the latch from the recesses. A pushrod is coupled to the sleeve, the pushrod is configured to lift and lower the valve when the latch is in the latched condition. The pushrod is further configured to reciprocate inside the sleeve to deactivate actuation of the valve when the latch is in the unlatched condition.

A method of controlling a cylinder deactivation mechanism comprises executing a valve lift event configured to lift a valve via a pushrod and rocker arm combination. The pushrod is coupled via a sleeve with a controllable latch in a latched condition. The controllable latch is configured with edges that are clamped in recesses of the sleeve during the valve lift event. A clamp force is supplied in part by pressure from the pushrod. A deactivation signal is sent to select the unlatched condition to collapse the latch from the recesses while the controllable latch is configured with edges that are clamped in recesses of the sleeve. A step of deactivating actuation of the valve is done by collapsing the latch from the recess once the valve lift event is complete and the clamp force supplied in part by pressure from the pushrod diminishes.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIGS. 9A-9C are illustrations for explaining a critical shift aspect.

FIG. 12A is a plot of torque variations caused by friction variations as a function of cylinder deactivation and engine speed.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Figure 1:
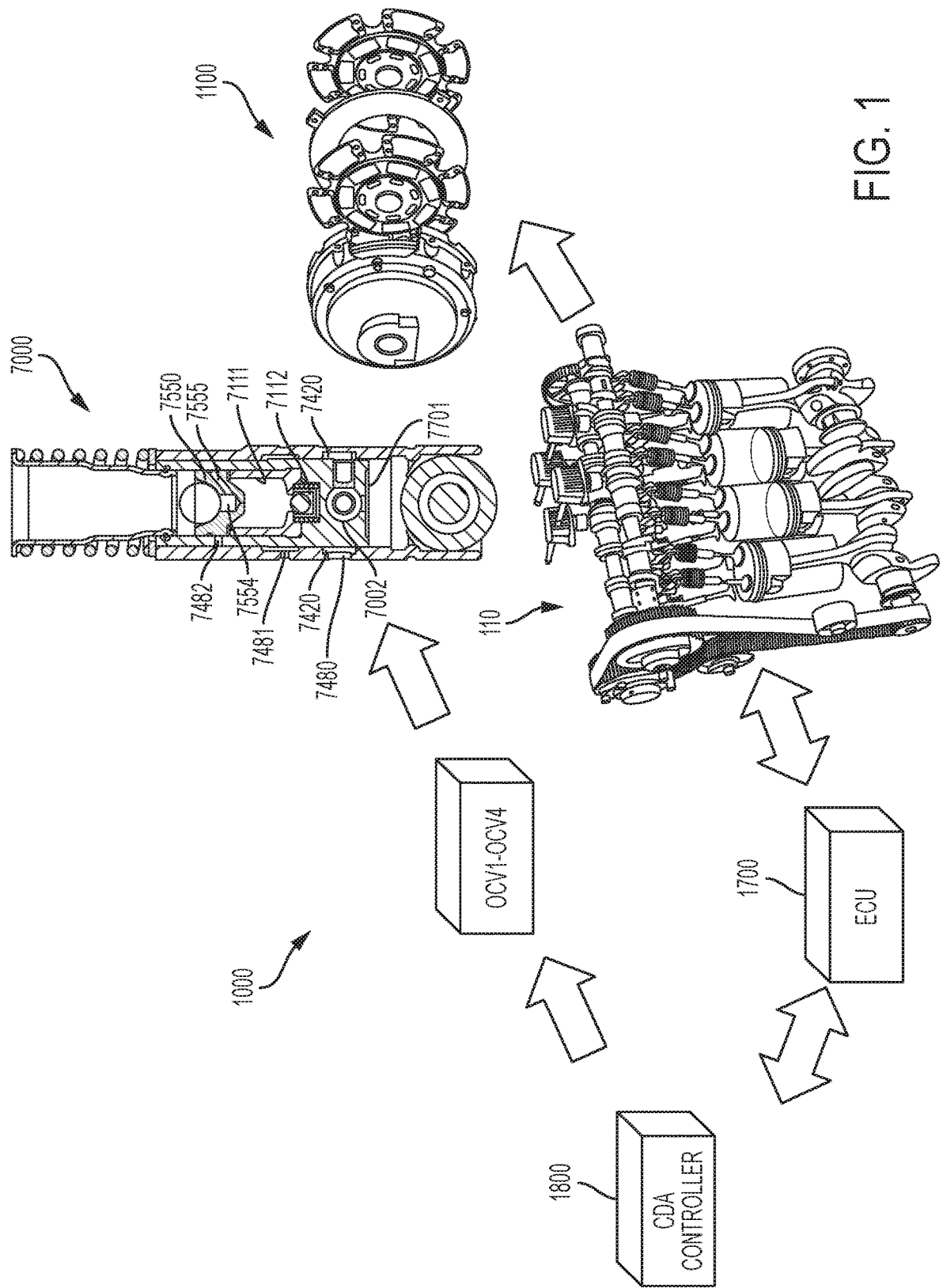
FIG. 1 is a system layout for an engine system.

FIG. 1 is a schematic representation of a friction loss management system 1000 for an engine 110. A combustion engine 110 comprises a crankshaft 101 and a plurality of cylinders 1-4 associated with the crankshaft. A 4-cylinder engine is illustrated as an example, though other numbers of cylinders can be used. The crankshaft 110 outputs torque to a vehicle driveline via a transmission and affiliated clutch 1100. The clutch 1100 can dampen NVH (noise vibration harshness) from the engine 110. Determining a number of cylinders can result in a combination of active cylinders and deactivated cylinders which creates torsionals. The torsionals are compensated for by using one of a transmission or a clutch that is affiliated with the engine.

The engine electronically communicates with and is controlled by an ECU (electronic control unit) 1700, by way of actuators, sensors, and other connectivity. The ECU 1700 communicates with a CDA (cylinder deactivation) controller 1800. The CDA controller 1800 electronically communicates with and controls OCV1-OCV4 (oil control valves) or other actuation mechanisms such as solenoids or electronic switching mechanisms. An example of a cylinder deactivation mechanism 7000 is shown in FIG. 1, and it is controlled by OCV1. The cylinder deactivation mechanism 7000 is selectively actuated to permit lift and lowering of a valve or to deactivate actuation of the affiliated valve.

Figure 10C:
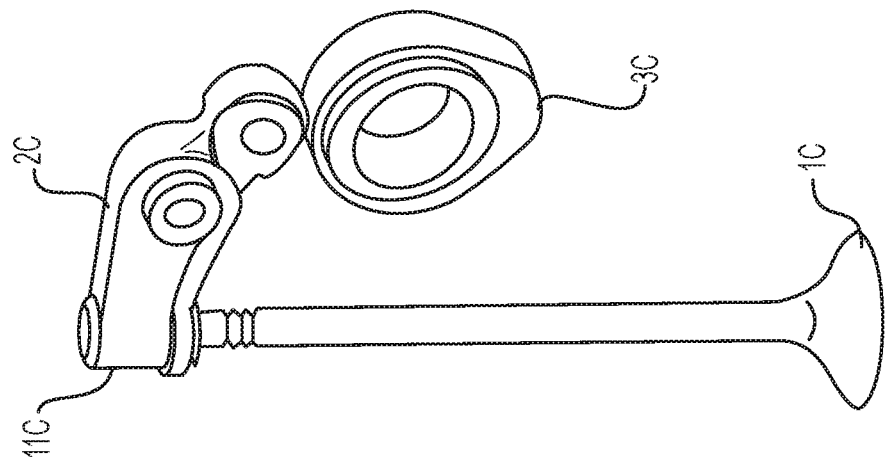
FIGS. 10A-10E are illustrations of alternative engine types that can be used with the disclosed systems and methods.
Figure 10B:
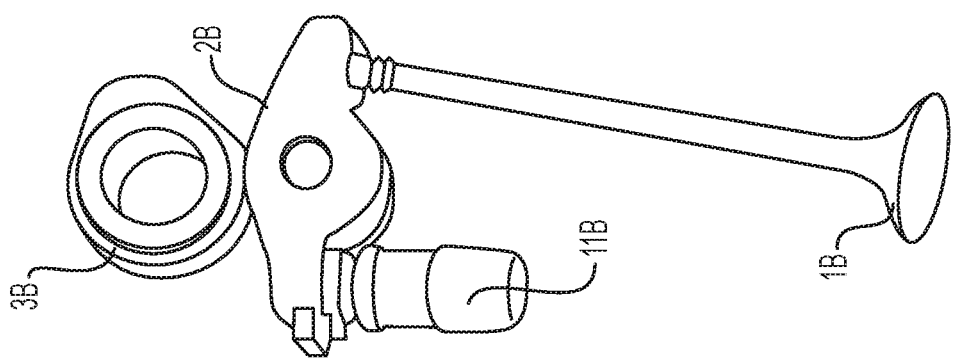
Figure 10A:
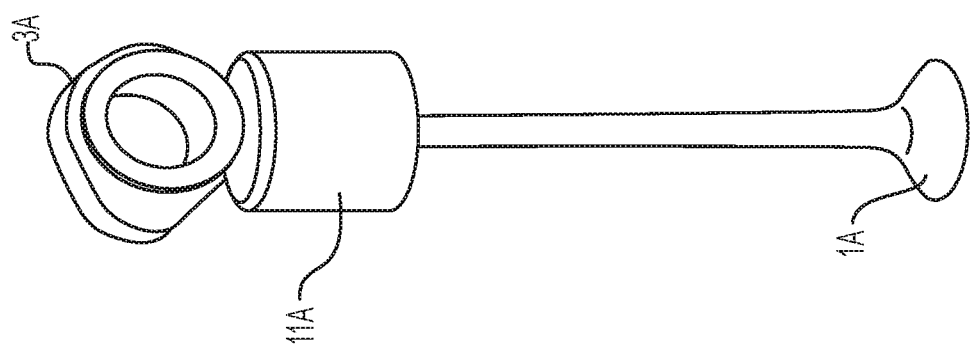
Figure 10E:
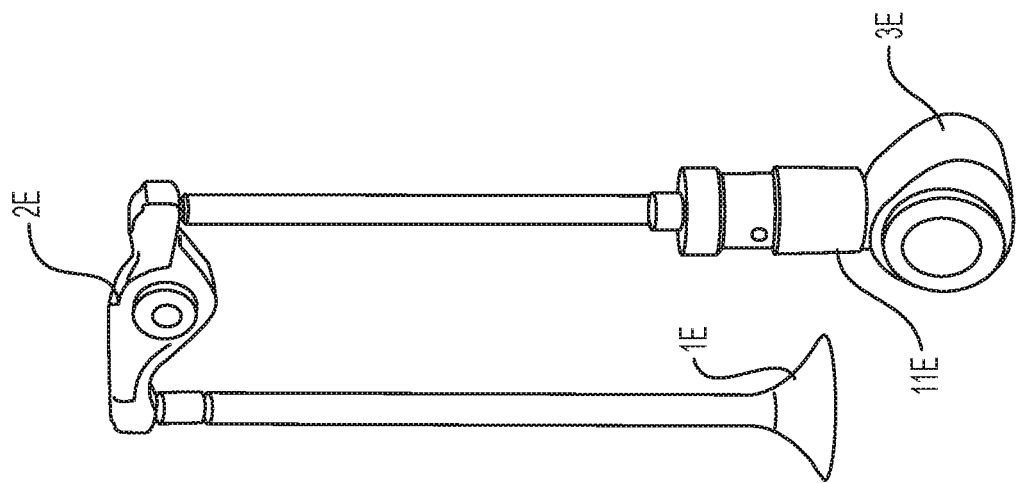
Figure 10D:
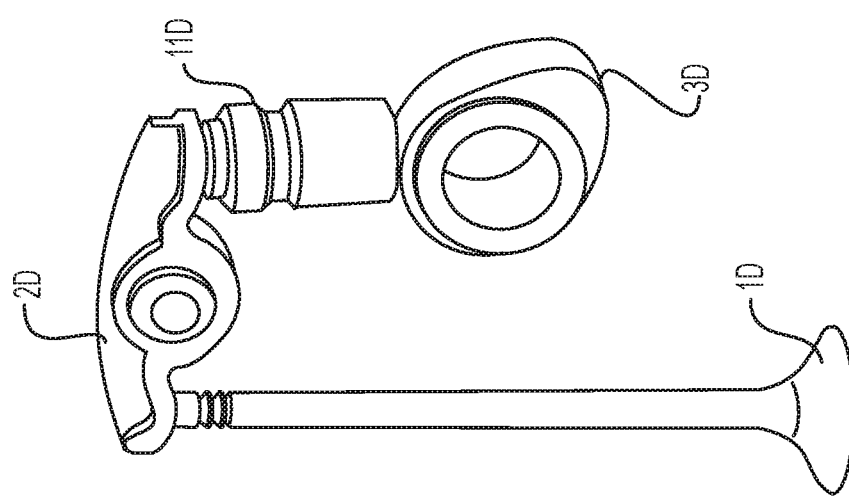

Each of the plurality of cylinders 1-4 comprises a respective reciprocating piston assembly 160 connected to the crankshaft 110. A fuel injector 310 is connected to an injection controller 300, and the fuel injector configured to deactivate and reactivate, and can also be configured to vary the quantity and timing of fuel injected. While one example of an engine 110 is shown in FIG. 1, other engines are considered, for example gasoline, diesel, hybrid, alternative fuel, etc. Various numbers and orientations of cylinders are also considered, including those summarized in FIGS. 10A-10C, and further including, for example, in-line, "V," and "boxer." The friction management principles discussed below apply to piston engines, including cam and camless engines.

The piston assembly 160 can comprise a ring pack of seals, indicated generally at 165, to keep combustion pressure in the respective cylinders 1-4. The ring pack can comprise upper, lower, and oil control ring seals, or other seals or sealing techniques. The cylinders 1-4 can be integrally formed with the engine block, 102 or the cylinders 104 can comprise cylinder liners 112. A combustion chamber 120 is formed within the cylinder so that when injected fuel is combusted, piston assembly 160 can transfer torque to crankshaft 101. The piston assembly 160 reciprocates in the cylinder according to a stroke cycle so that intake, combustion, and exhaust functions can be performed. The movement of the piston assembly 160, which is sealed against the cylinder wall or the cylinder liner 112, is subject to increasing friction values as the speed of reciprocation increases.

An intake valve 130 is connected to an intake valve controller, which can be VVA (variable valve actuation) controller 200 or one or both of the ECU 1700 and CDA controller 1800. The intake valve 130 can be configured to deactivate and reactivate so that the cylinder can perform an active firing or so that the cylinder can minimize friction and energy loss to the engine system. Likewise, an exhaust valve 150 is connected to an exhaust valve controller, which can be VVA (variable valve actuation) controller 200 or one or both of the ECU 1700 and CDA controller 1800. The exhaust valve 150 can be configured to deactivate and reactivate so that the cylinder can perform an active firing or so that the cylinder can minimize friction and energy loss to the engine system.

Figure 2A:
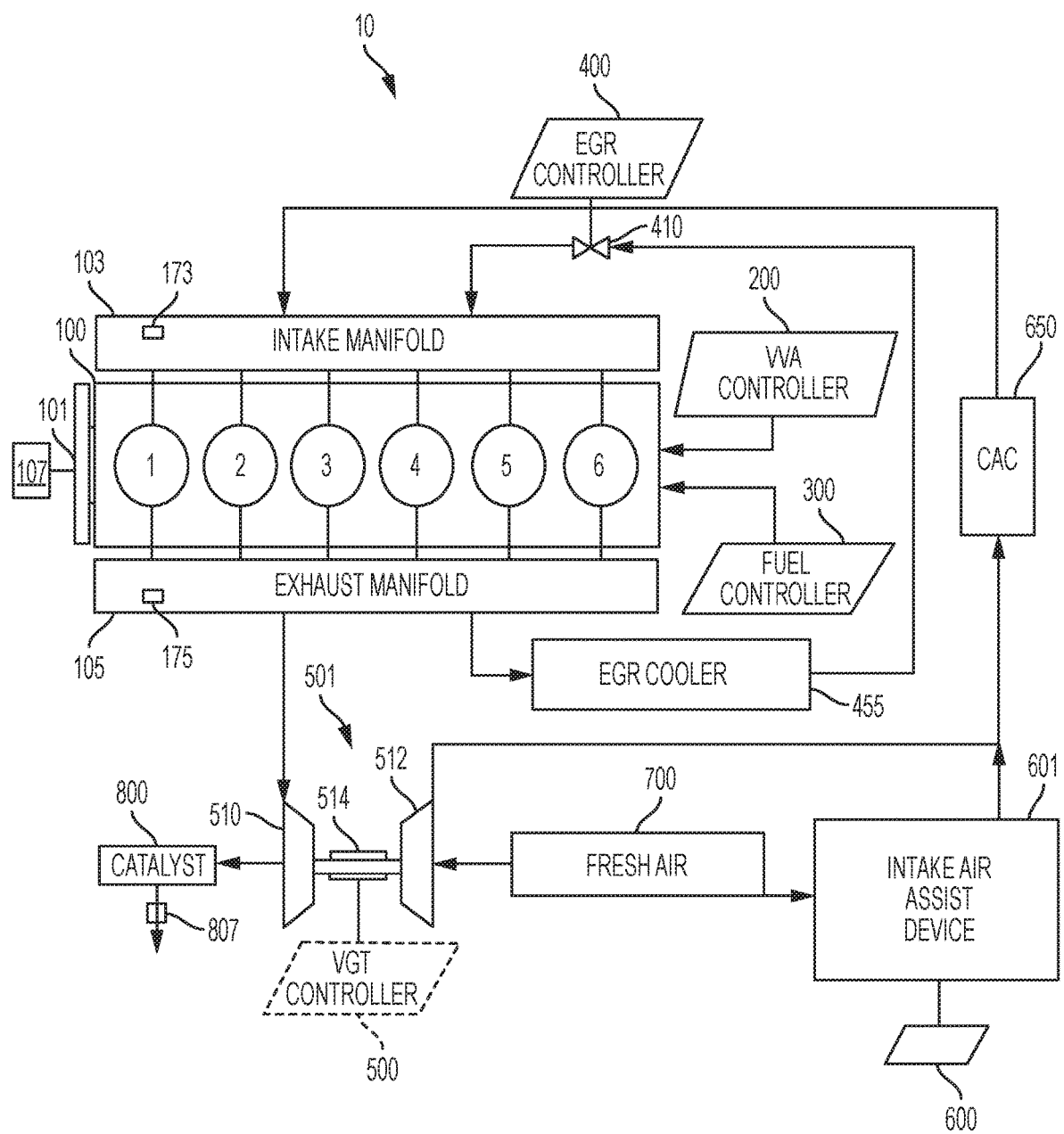
FIGS. 2A-2C are alternative engine systems.

Turning to FIG. 2A, a schematic for an engine system 10 is shown. An engine 100 comprises 6 cylinders 1-6. Other numbers of cylinders can be used, but for discussion, 6 cylinders are illustrated. The cylinders 1-6 receive intake fluid, which is combustion gas, such as air, or air mixed with exhaust (exhaust gas recirculation "EGR"), from the intake manifold 103. An intake manifold sensor 173 can monitor the pressure, flow rate, oxygen content, exhaust content or other qualities of the intake fluid. The intake manifold 103 connects to intake ports 133 in the engine block to provide intake fluid to the cylinders 1-6. In a diesel engine, the intake manifold has a vacuum except when the intake manifold is boosted. CDA is beneficial, because the cylinder can be closed. Instead of pulling the piston down against a vacuum situation, the deactivated cylinder has a volume of fluid that is not at a vacuum. Fuel efficiency is gained by not drawing the piston down against a vacuum. Further efficiencies are gained by deactivating the cylinder, because the ring pack 165 on the piston assembly 160 does not frictionally engage against the cylinder, either directly or via a liner.

Fuel is injected to individual cylinders via a fuel injection controller 300. The fuel injection controller 300 can adjust the amount and timing of fuel injected in to each cylinder and can shut off and resume fuel injection to each cylinder. The fuel injection for each cylinder 1-6 can be the same or unique for each cylinder 106, such that one cylinder can have more fuel than another, and one cylinder can have no fuel injection, while others have fuel.

A variable valve actuator (VVA) 200 also couples to the cylinders 1-6 to actuate intake valves 130 and exhaust valves 150. The VVA 200 can change the actuation of the intake valves 130 and exhaust valves 150 so as to open or close the valves normally, early, or late, or combinations thereof, or cease operation of the valves. The VVA controller 200 can be a stand-alone processor, a sub-component of the ECU 1700, or a subcomponent of the CDA controller 1700. In a further alternative, the ECU 1700 can integrate the CDA controller 1700 and the VVA controller 200.

Early Intake Valve Opening (EIVO), Early Intake Valve Closing (EIVC), Late Intake Valve Opening (LIVO), Late Intake Valve Closing (LIVC), Early Exhaust Valve Opening (EEVO), Early Exhaust Valve Closing (EEVC), Late Exhaust Valve Opening (LEVO), Late Exhaust Valve Closing (LEVC), a combination of EEVC and LIVO or Negative Valve Overlap (NVO) can be implemented by the VVA controller 200. VVA controller 200 can cooperate with a hydraulic, electric, or electric solenoid system to control the intake and exhaust valves 130, 150. The engine 100 can be cam or camless, or a hybrid "cam-camless VVA."

Figure 3B:
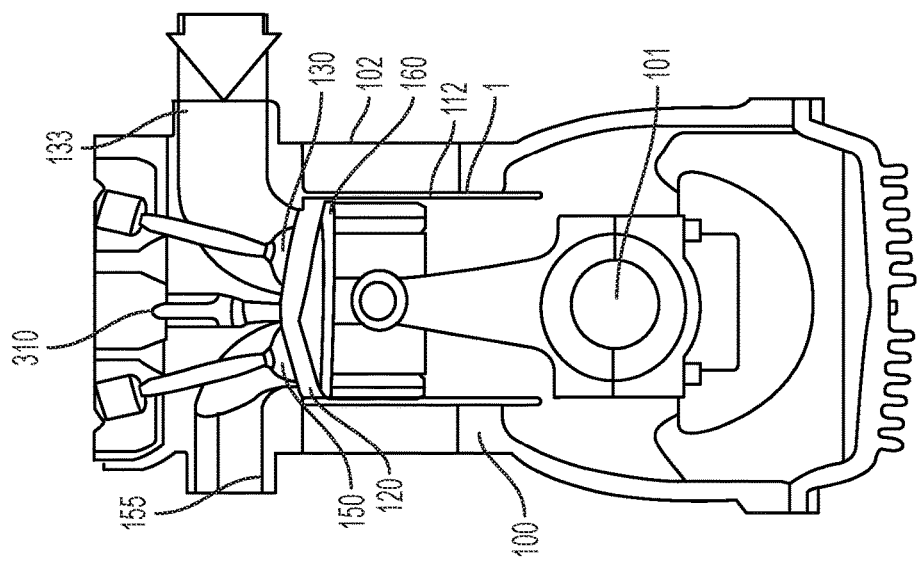
FIG. 3A-3C are examples of an engine comprising cylinders and piston assemblies.
Figure 3A:
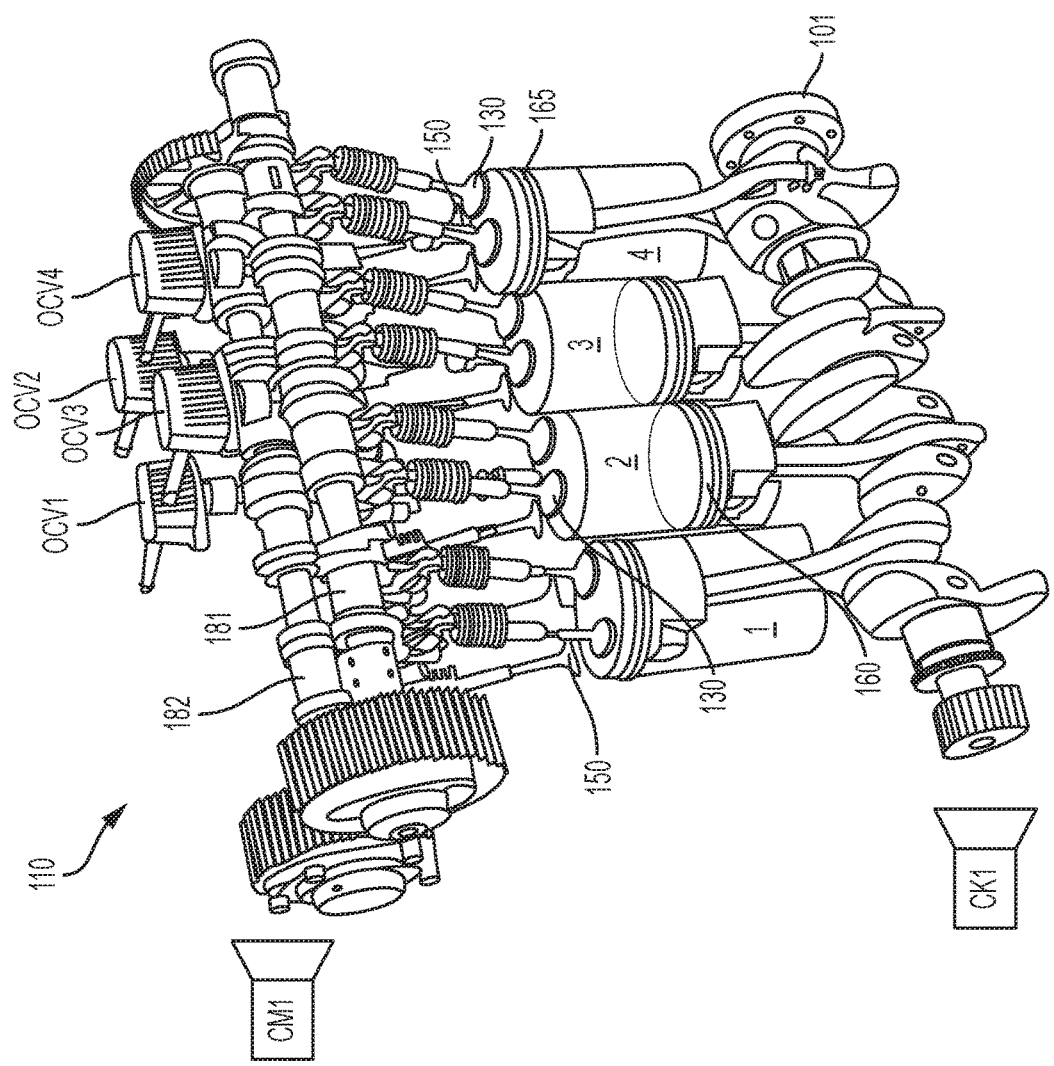
Figure 3C:
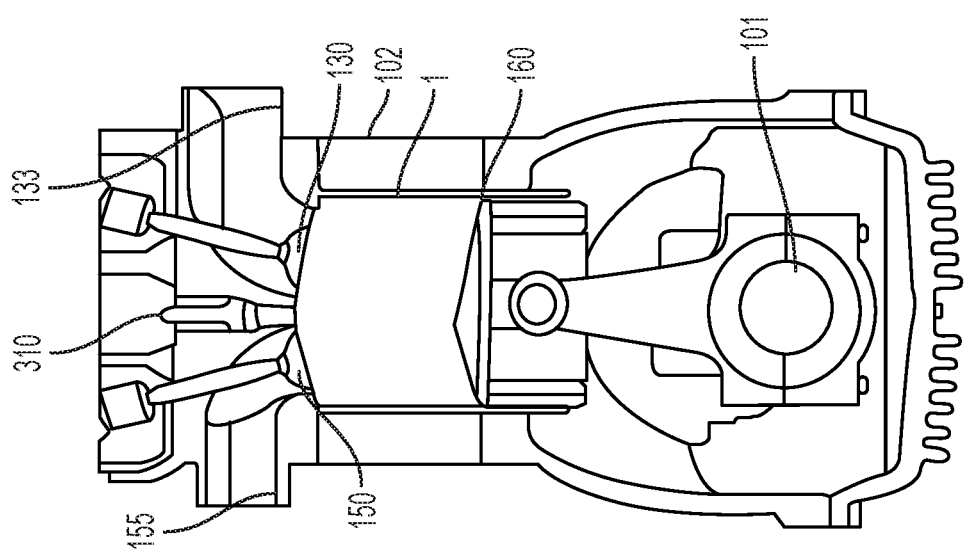

The intake and exhaust valves 130, 150 can either couple to a cam system for actuation, as in the examples of FIGS. 7A, 8A, & 10A-10E, a hydraulic rail, a latched rocker arm, other rocker arm, an electro hydraulic actuator, etc. Or a camless direct acting mechanism can selectively operate the individual valves. While FIGS. 3B &3C show one intake valve 130 and one exhaust valve 150, it is possible to have two intake valves 130 and two exhaust valves 150 per each cylinder, as in FIG. 3A. The engine block 102 is removed for the example of FIG. 3A for clarity, and the cylinders are shown in broken lines.

A diesel engine works by compressing intake fluid in a cylinder 1-6 using a piston 160. Fuel is injected via fuel injector 310. The high heat and compression ignites the fuel, and combustion forces the piston from top dead center (TDC) to bottom dead center (BDC) and torque is thereby directed to the crankshaft 101. Diesel operation can be referred to as "4 stroke," though other operation modes such as 2-stroke and 8-stroke are possible. In 4-stroke, the piston moves from TDC to BDC to fill the cylinder with intake fluid (stroke 1). The start of the cycle is shown in FIG. 3B, and FIG. 3C shows the end of stroke 1, when the cylinder is full of intake fluid. The piston rises back to TDC (stroke 2). Fuel is injected and ignites to push the piston 160 to BDC (stroke 3). The piston rises again to TDC to expel the exhaust out the exhaust valve (stroke 4). The intake valve 130 is open during stroke 1 and closed during strokes 2-4, though the VVA 200 can adjust the timing of opening and closing. The exhaust valve 150 is open during stroke 4 and closed during strokes 2-4, though the VVA 200 can adjust the timing of opening and closing.

Exhaust gases leave cylinders through exhaust ports 155 in engine block 102. Exhaust ports 155 communicate with an exhaust manifold 105. An exhaust manifold sensor 175 can monitor the pressure, flow rate, oxygen content, nitrous or nitric oxide (NOx) content, sulphur content, other pollution content or other qualities of the exhaust gas. Exhaust gas can power a turbine 510 of a variable geometry turbocharger (VGT) 501 or other turbocharger. The turbocharger 501 can be controlled via a turbocharger controller 500 to adjust a coupling 514 between the turbine 510 and the compressor 512. The VGT can be adjust so as to control intake or exhaust flow rate or back pressure in the exhaust.

Exhaust gas is filtered in an aftertreatment system. The aftertreatment system can include a variety of pollution management mechanisms such as a hydrocarbon, fuel or urea doser. Several filters can be alone or in combination, such as DOC, DPF, SCR, NH3, Cu—Ze SCR, among others. One or more catalyst 800 filters pollution, and can comprise a diesel particulate filter (DPF), Diesel catalysts typically comprise a variety of rare earth metals to filter pollution, including NOx. At least one exhaust sensor 807 is placed in the aftertreatment system to measure exhaust conditions such as tailpipe emissions, NOx content, exhaust temperature, flow rate, etc. The exhaust sensor 807 can comprise more than one type of sensor, such as chemical, thermal, optical, resistive, velocity, pressure, etc. The exhaust sensor 807 can comprise an array of sensors, with sensor distribution options including before, after, or within the catalyst 800. A sensor linked with the turbocharger 501 can also be included to detect turbine and compressor activity.

Figure 2B:
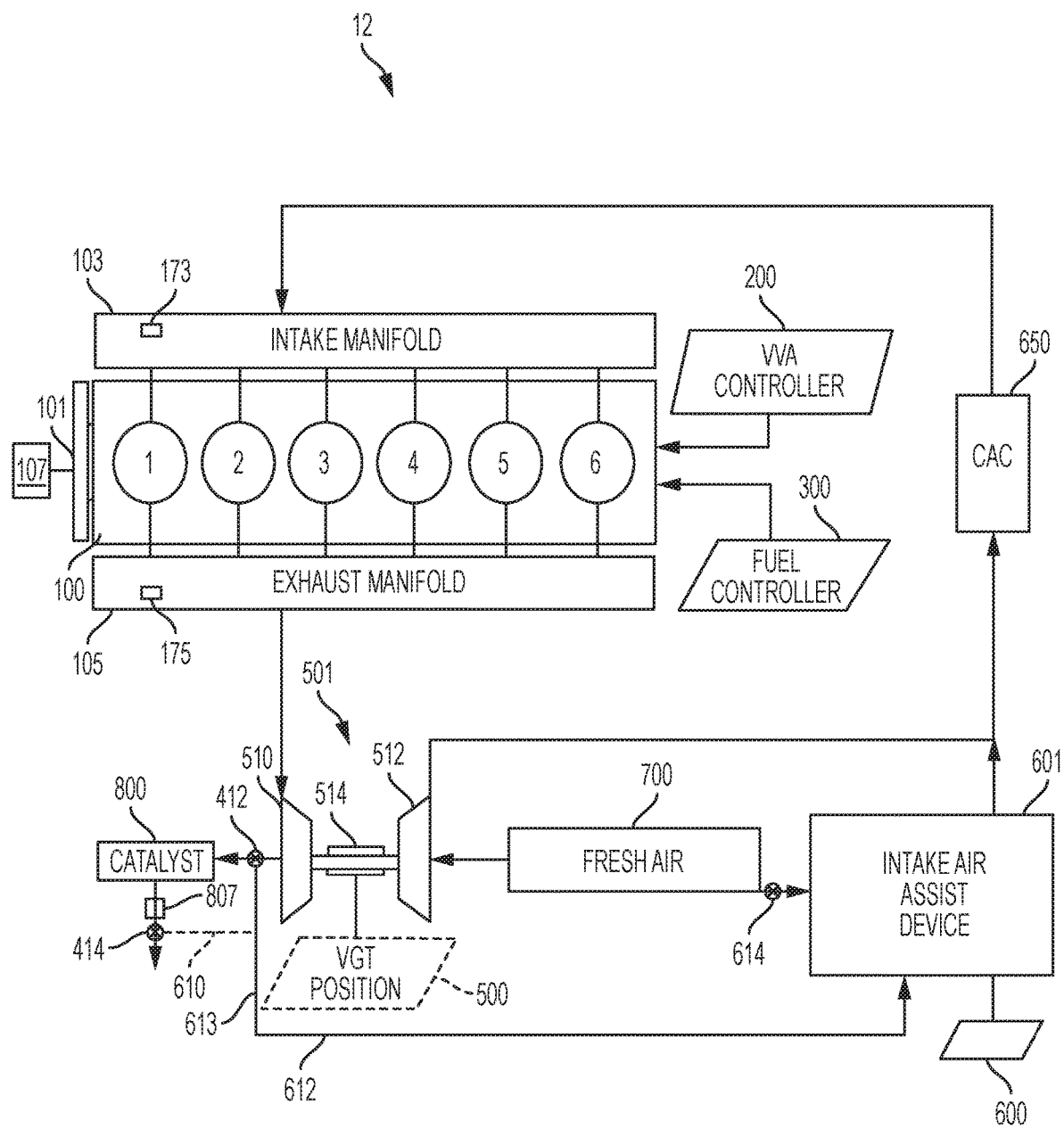
Figure 2C:
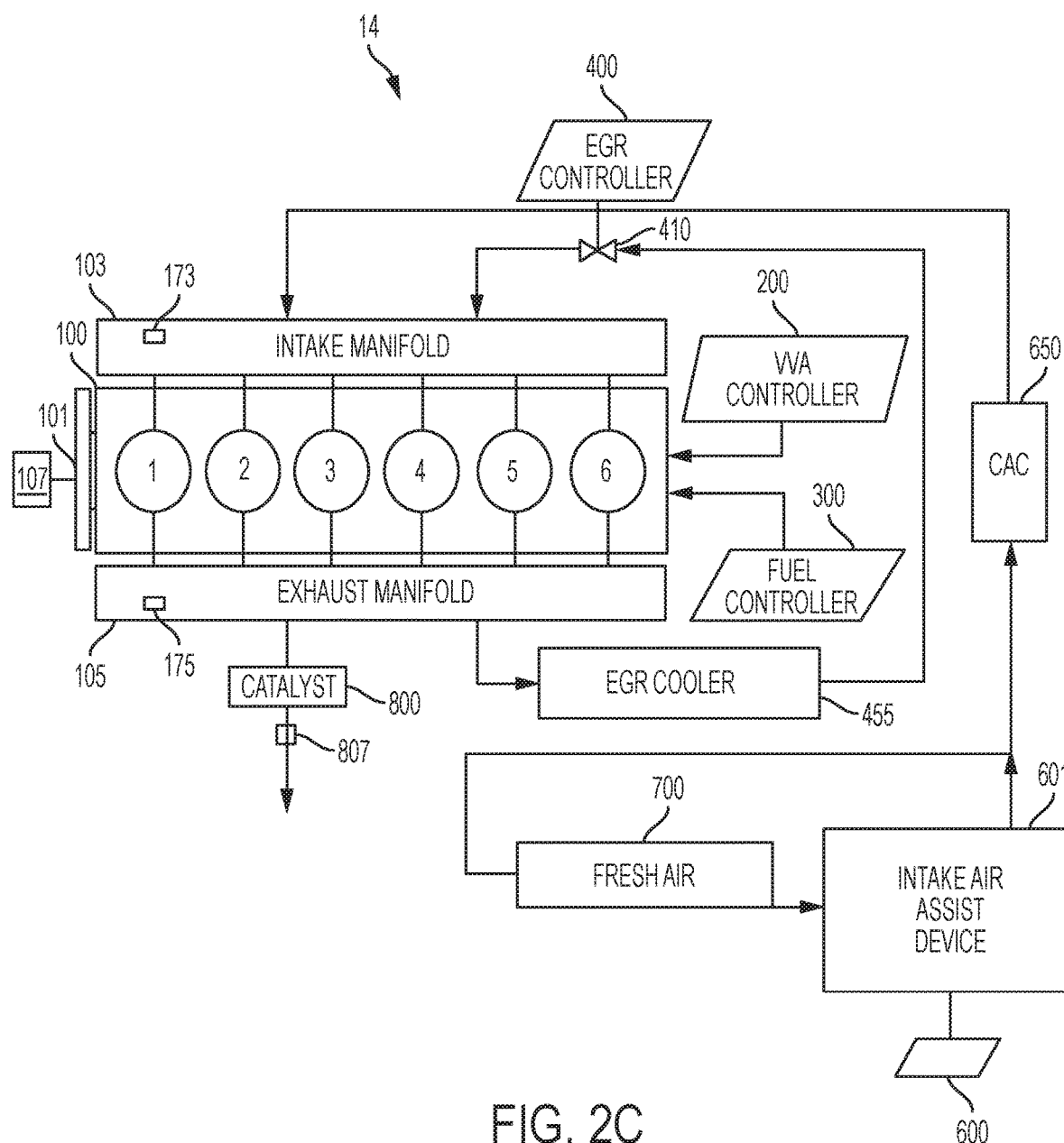

Exhaust can exit the system after being filtered by the at least one catalyst 800. Or, exhaust can be redirected to the intake manifold 103 via a variety of pathways, some of which are illustrated in FIGS. 2A-2C. In FIG. 2A, exhaust is cooled in an EGR cooler 455. An EGR controller 400 actuates an EGR valve 410 to selectively control the amount of EGR supplied to the intake manifold 103. The exhaust recirculated to the manifold 103 impacts the air fuel ration (AFR) in the cylinder. Exhaust dilutes the oxygen content in the manifold 103. Unburned fuel from the fuel doser, or unburned fuel remaining after combustion increases the fuel amount in the AFR. Soot and other particulates and pollution gases also reduce the air portion of the air fuel ratio. While fresh air brought in through the intake system 700 can raise the AFR, EGR can lower AFR, and fuel injection to the cylinders can lower the AFR further. Thus, the EGR controller, fuel injection controller 400 and intake assist controller 600 can tailor the air fuel ratio to the engine operating conditions by respectively operating EGR valve 410, fuel injector 310, and intake assist device 610. So, adjusting the air fuel ratio to a firing cylinder can comprise one of boosting fresh air to the at least one firing cylinder by controlling a supercharger, or decreasing air fuel ratio to a firing cylinder by boosting exhaust gas recirculation to the firing cylinder. This can be done with or without augmenting a turbocharger 501.

Variant engine system 12 in FIG. 2B removes one exhaust gas recirculation path in favor of alternate pathways. EGR controller 400 can couple instead to EGR valve 412 to direct exhaust gas along second EGR path 613, along EGR path 612 to intake air assisting device 601. Alternatively, exhaust gas can be recirculated after being filtered by catalyst 800. So EGR valve 414 can be controlled by EGR controller 400 to direct some portion of EGR along first EGR path 610, along EGR path 612, to intake assisting device 601. Controlling EGR valve 412 or EGR valve 414 tailors the amount of exhaust included in the air fuel ratio within cylinders 1-6.

As schematically shown in FIG. 2C, using a very small intake assist device 601 extends the operating range of cylinder deactivation (CDA) by boosting the available oxygen. A small air pump, supercharger, or fan is connected to an oxygenating source, such as intake system 700, The intake system can supply fresh air to increase the air fuel ratio in the intake manifold of the diesel engine. Instead of limiting CDA to low load or idle conditions, the intake assist device 601 can increase air flow to the intake manifold and can increase the air to the cylinders. This can provide a more lean burn engine by raising the air portion of the AFR. While it is possible to lower the AFR during cylinder deactivation (CDA) mode, the intake assist device makes it possible to increase the AFR by adding flow against a low pressure intake manifold. This is contrary to the prior art, which seeks to eliminate energy drains during CDA mode. EGR does not need to be suspended to limit CO2 contributions, but it can be regulated.

By controlling the air fuel ratio to the cylinders 1-6, it is possible to eliminate the turbocharger 501, thus simplifying the control algorithm outputs and reducing system outlay. In FIG. 2C, the turbocharger 501 is eliminated. Fresh air can be naturally aspirated through the intake system 700 to the intake manifold 103, and the intake assist device 601 can be selectively controlled to boost the intake flow to the intake manifold 103. Should the intake assist device heat the intake flow, such as when using a supercharger, a charge air cooler 650 can optionally be included to regulate intake flow temperature.

Figure 5:
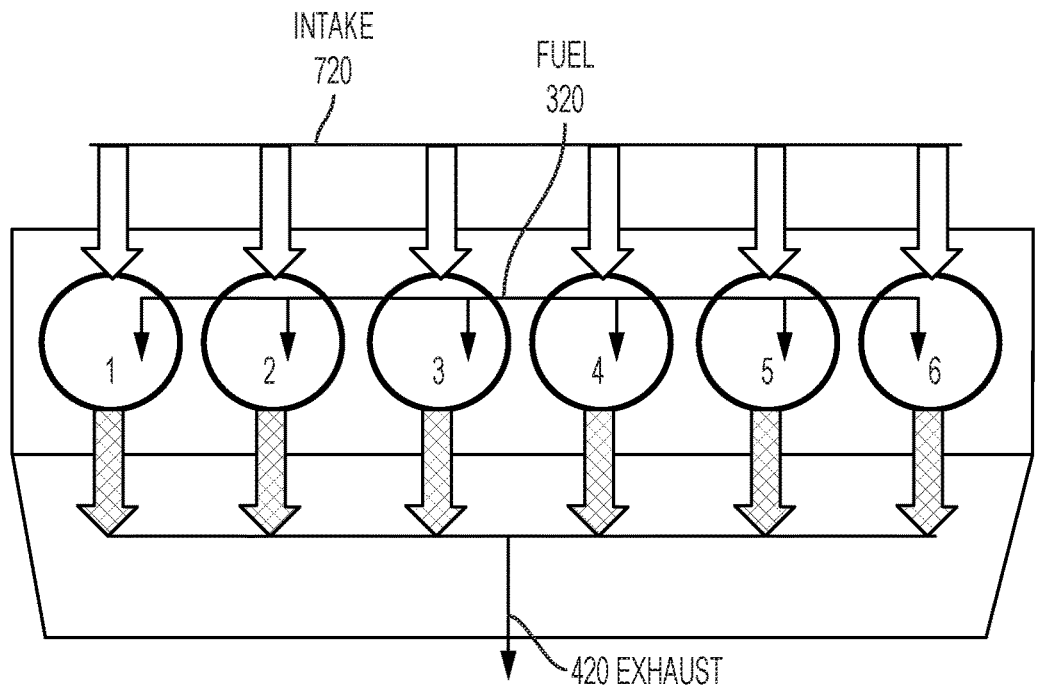
FIG. 5 is an exemplary schematic showing 6 active cylinders firing.

FIG. 5 shows a normal operation mode for an engine system 10, 12 or 14 or like engine system. Intake fluid 720 is provided to each cylinder 1-6. Each cylinder receives fuel 320 and conducts a combustion cycle. Exhaust 420 exits each cylinder 1-6. A normal mode can be used herein during certain load and speed conditions of the engine, such as when full torque output is desired. Or, as when a cruising mode provides a better temperature or NOx output for the engine system than CDA mode.

Figure 6:
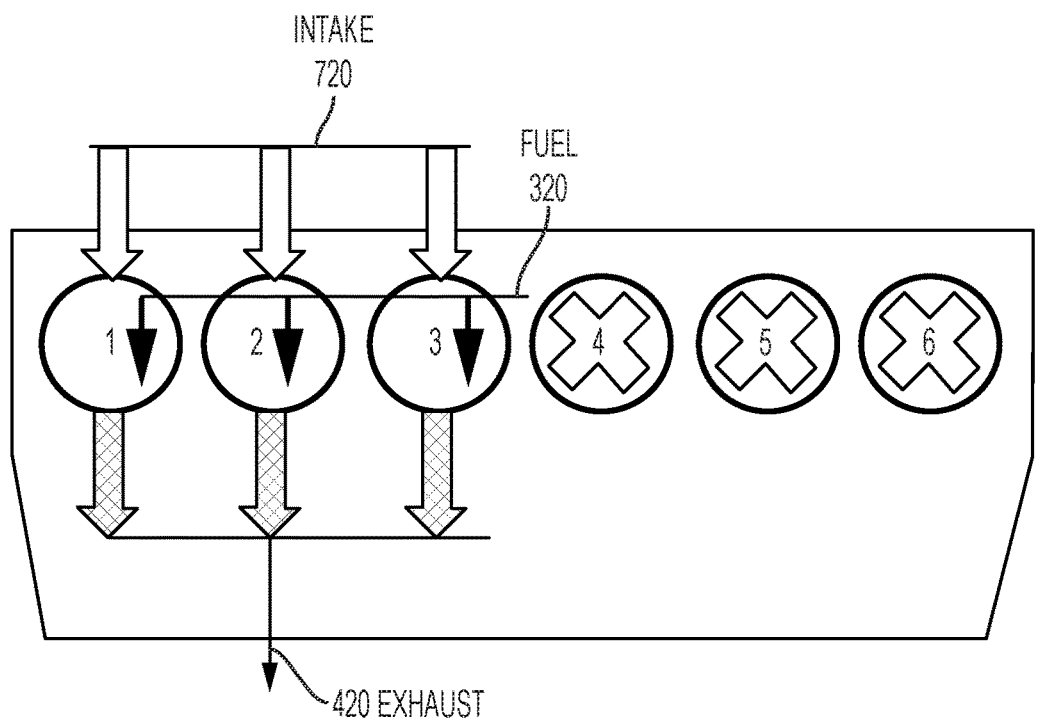
FIG. 6 is an exemplary schematic of a cylinder combination comprising 3 active cylinders firing and 3 deactivated cylinders.

FIG. 6 shows cylinder deactivation mode (CDA). Half of the cylinders are deactivated. Cylinders 1-3 receive fuel commensurate with the torque output requirement. When the engine is required to maintain a certain torque level, and CDA mode is implemented, it is possible to deactivate cylinders 4-6 while doubling fuel to cylinders 1-3. Because of fuel economy benefits that inure from decreased friction on the totality of cylinders, it is possible to provide less than double the fuel to the firing cylinders 1-3 to obtain the same torque level as firing all six cylinders in normal mode. For example, when shutting off half of the cylinders, the firing cylinders could receive 1.95 times more fuel to maintain steady torque output during deactivation. So, CDA mode yields a fuel economy benefit by decreasing fuel use for a desired torque output.

By deactivating cylinders in a cam-style engine, additional fuel economy benefits inure by reducing friction on the cam rail. Deactivating cylinders improves engine efficiency, and thus fuel economy, by reducing parasitic friction losses. One method for minimizing friction considers the friction between the piston assembly 160 and the cylinder wall or cylinder liner. Friction data can be stored in the control unit(s) or sensed real time. Cylinder deactivations can be selected to minimize friction losses. Another method for minimizing friction relates to a cam-style engine. This engine comprises at least one cam rail, wherein the at least one cam rail comprises at least one respective cam lobe for each of the plurality of cylinders. The at least one respective cam lobe rotates with the at least one cam rail to lift and lower one of the respective intake valves. Friction between the at least one respective cam lobe and its affiliated roller finger follower or its affiliated roller finger lifter contributes to the sensed or stored friction values. As seen in FIGS. 10A-10E, various cam lobes 3A-3E rotate, and can have parasitic friction losses. Drag between the cam lobes 3A-3E can be reduced by deactivating the valve. Interrupting the linkage between the cam lobes and the valves 1A-1E reduces the amount of material resisting the cam lobes as they spin, and so the cam rails 182, 183, upon which the cam lobes rotate, require less energy to rotate, reducing energy burdens on the system, and ultimately reducing fuel use.

One or more of rocker arms 2B-2E or hydraulic lash adjusters 11A-11E can be modified to incorporate a cylinder deactivation mechanism, such as those shown in FIGS. 7A-7C and 8A & 8B, for example. Thus, Type I, Type II, Type III, Type IV, and Type V engines can benefit from the systems and methods disclosed herein.

Intake and exhaust valves 130, 150 move as controlled by VVA controller 200 for firing cylinders 1-3. However, intake and exhaust valves 130, 150 are not actuated for cylinders 4-6.

Increasing the fuel to cylinders 1-3 makes the mixture in the cylinders 1-3 more "rich." The air fuel ratio for the cylinder is lower, because there is less air and more fuel. The resulting exhaust is hotter. As the air fuel ratio nears a lower limit, the turbine out temperature (TOT) increases. Diesel engine system 14 does not use a turbocharger 501, and so "turbine out temperature" is used as a phrase of convenience to indicate the exhaust temperature at a location a turbine 501 would be. The TOT follows a polynomial curve as AFR increases.

Unlike gasoline engines, which must have a stoichiometric air:fuel ratio (AFR) such as 14.7:1 (fourteen point seven parts air to one part gasoline), diesel systems can vary the AFR in a cylinder and still work. The AFR in a firing cylinder can range from, for example 14:1-100:1 (fourteen parts air to one part diesel fuel up to 100 parts air to one part diesel fuel). Soot is an issue at low AFR, and so it is beneficial to keep the AFR 22:1-24:1 when high temperature operation is desired. To avoid soot, adjusting the air fuel ratio to a firing cylinder comprises adjusting one or both of the intake gases and the fuel injection to maintain the selected air fuel ratio. CDA mode can operate with an AFR between 17:1-70:1, or 20:1-50:1. Another AFR range is 24:1-45:1. One AFR range for providing an aftertreatment catalyst bed temperature around 300 degrees Centigrade is 30:1-45:1 AFR.

Because of the polynomial relationship between AFR and TOT, it is possible to develop a control algorithm for sensing a low temperature condition and adjusting the air fuel ratio to bring the exhaust temperature to a desired range. Using the above exhaust gas recirculation (EGR) controller 400, fuel injection controller 300 and intake assist controller 600 is one aspect of regulating the exhaust temperature. Entering cylinder deactivation (CDA) mode on select cylinders is another aspect of adjusting AFR and TOT.

Entering CDA mode reduces air flow through the engine 100. Using all 6 cylinders draws more air through the engine. Less air is drawn through the engine in CDA mode and pushed in to the exhaust manifold 105, because the intake and exhaust valves 130, 150 are deactivated to CDA mode cylinders. This reduces the flow rate of the exhaust 420. The exhaust 420 is more stagnant in the aftertreatment system, and so it lingers in catalyst 800 longer, thereby transferring more pollution and heat to the catalyst 800. Inhibiting convection in the catalyst 800 in this way, by entering CDA mode, is an effective way to "heat soak" the catalyst. A hot catalyst 800 is an efficient catalyst.

For a given mixture of catalyst materials (Platinum, Palladium, Rhodium, etc.), the catalyst 800 has an ideal operation temperature range. In this ideal temperature range, the catalyst is the most efficient for capturing pollution. So, controlling the temperature of the exhaust controls the temperature of the catalyst 800, which controls the efficacy of the catalyst 800 to capture pollution. "Heat soaking" the catalyst 800, by reducing convection by entering CDA mode permits hot exhaust to transfer heat to the catalyst 800 to raise the catalyst to the ideal temperature. Moving in and out of CDA mode also controls the exhaust temperature by adjusting the AFR in each cylinder. Additionally controlling the AFR via one or more of EGR valves, intake assist devices, and fuel injection further impacts the exhaust temperature and pollution capture.

The engine system can comprising an exhaust management system. Determining a number of cylinders is further based on heat soaking the exhaust management system. Determining a number of cylinders can be further based on reducing convective heat transfer in the exhaust management system such that, as the determined number of cylinders increases, the more reduction in convective heat transfer is achieved.

Figure 16:
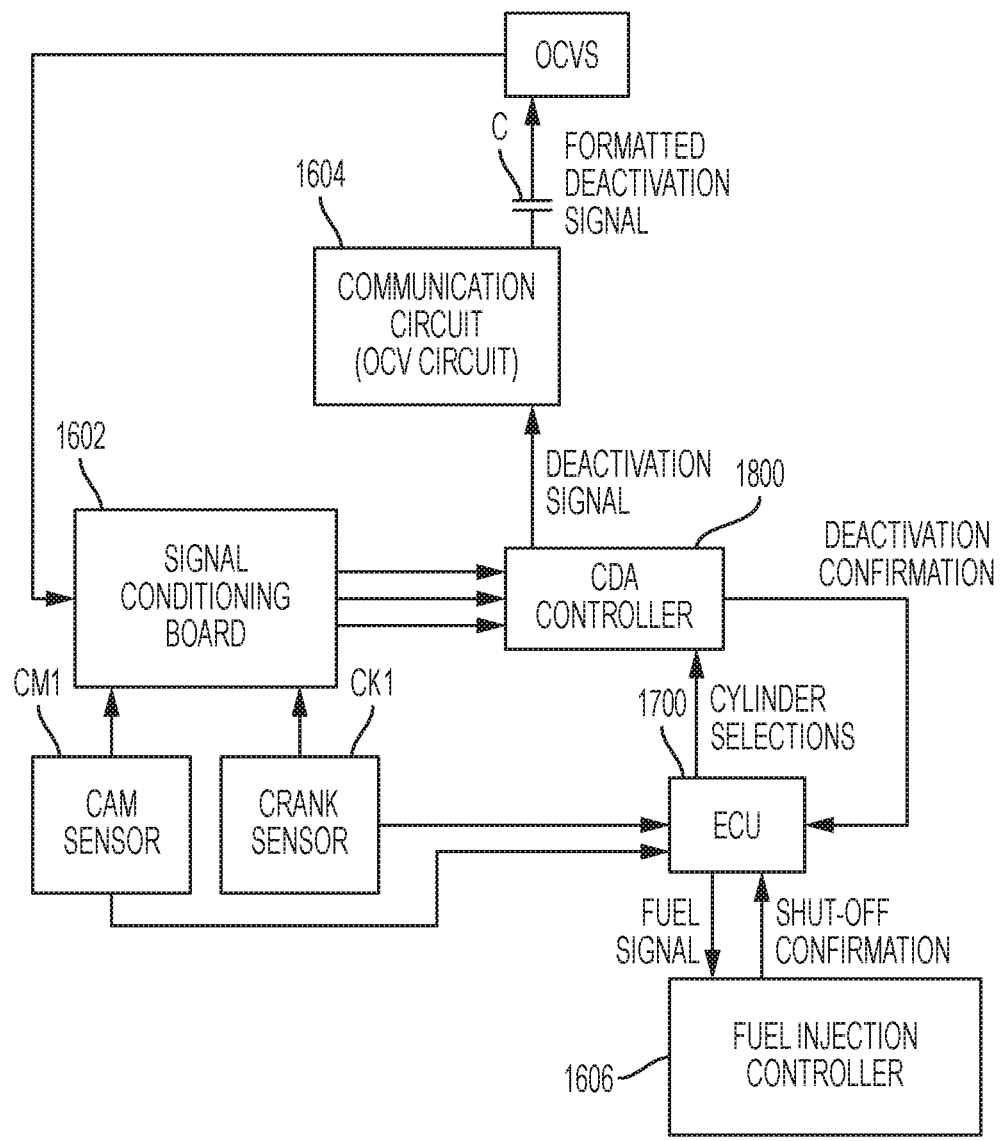
FIG. 16 is an example of a system layout
Figure 17:
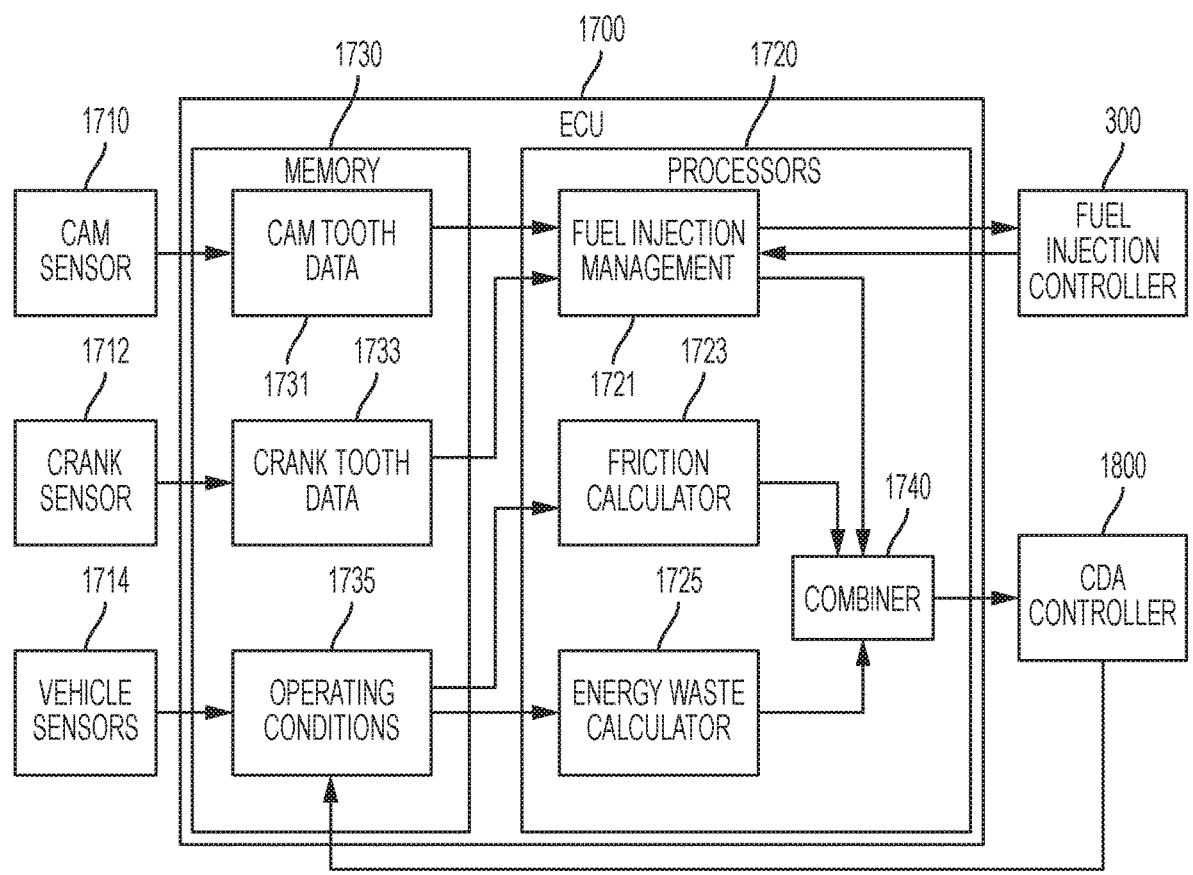
FIG. 17 is an example of a schematic for an engine electronic control unit.
Figure 18:
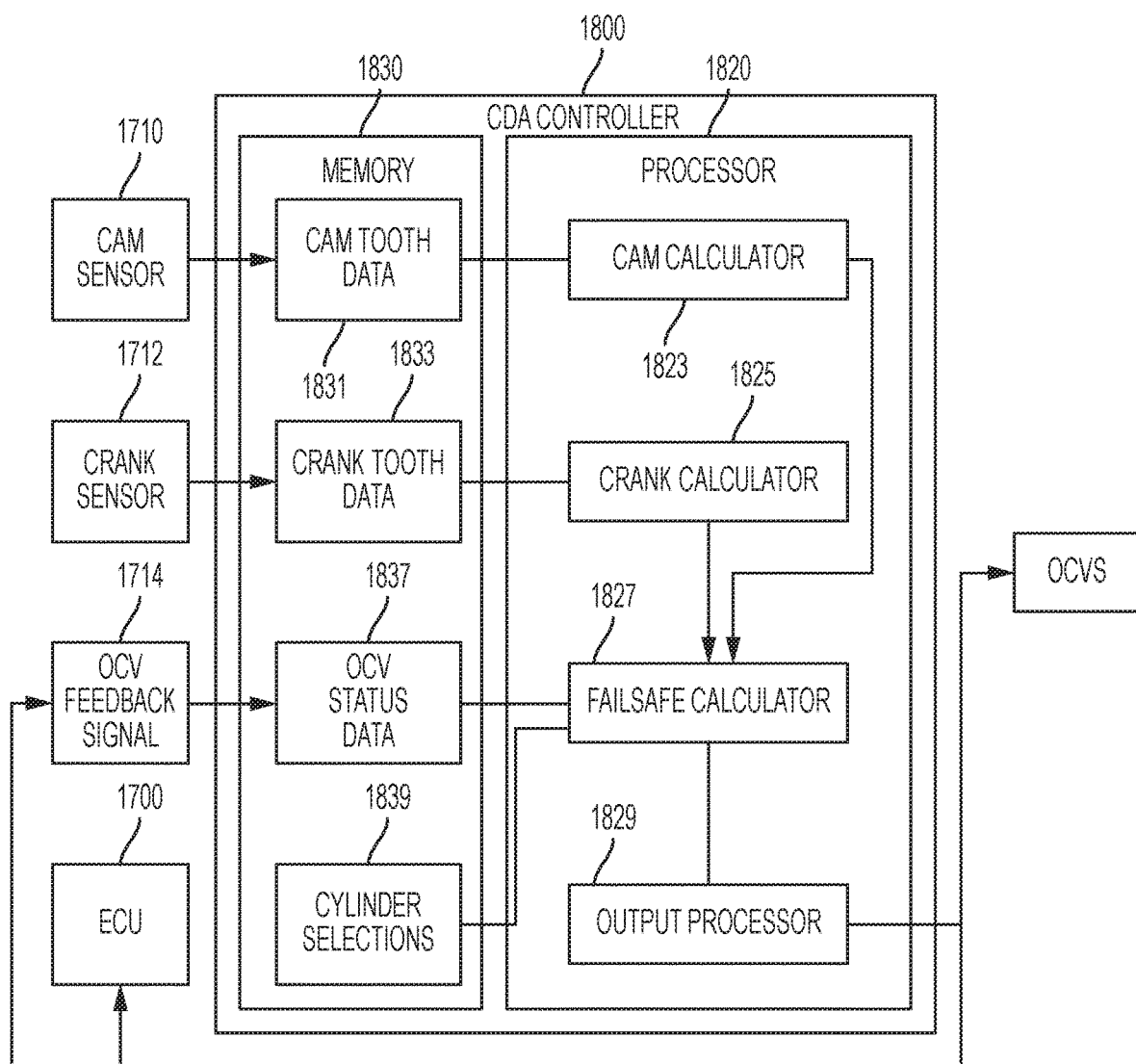
FIG. 18 is an example of a schematic for a cylinder deactivation controller.

Computer control can be implemented to process vehicle conditions in real time to dynamically adjust the number and location of cylinders selected for deactivation. As above, a control unit can comprise one or more of a VVA controller 200, ECU 1700 or CDA controller 1800 integrated in to a central control unit 2100 (FIG. 21), or a network comprising these (FIG. 16). The control unit comprises at least one processor 1720, 2120, 1820, at least one memory device 2130, 1730, 1830, and at least one set of processor-executable control algorithms stored in the at least one memory device. Allocation programming and networking can enable remote devices to be controlled by control unit(s), and the processor can be broken up in to a plurality of subroutines and subprocessors, as illustrated. The at least one memory device 2130, 1730, 1830 is a tangible readable memory structure, such as RAM, EPROM, mass storage device, removable media drive, DRAM, hard disk drive, etc. Signals per se are excluded. The algorithms necessary for carrying out the methods disclosed herein are stored in the at least one memory device 2130, 1730, 1830 for execution by the at least one processor 1720, 2120, 1820.

As an additional example, a computer structure can be near the turbocharger 501 for VGT control 500, another computer structure can be near the EGR valve 410 for EGR controller 400, another computer structure can be near the intake and exhaust valves for variable valve actuator 200, yet another computer controller can be placed for fuel injection controller 300, and yet another computer controller can be implemented for intake assist controller 600. Subroutines can be stored at the distributed computer structures, with centralized or core processing conducted at computer control system 1400.

At least one set of control algorithms is configured to receive engine power demand data from one or more power demand inputs, such as vehicle sensors 1714. The power demand data can be conveyed as, for example, one or more of an accelerator pedal position, affirmative user selection (switch selection), system selection (such as ULTRASHIFT or ULTRASHIFT PLUS gear selection, owned by Eaton Corporation of Cleveland, Ohio), drivetrain speed sensor, engine sensor output, etc. Other exemplary vehicle sensors 1714 can comprise intake manifold sensor 173, exhaust manifold sensor 175, and exhaust sensor 807 and sent along a BUS or like wiring to sensor data storage.

The control unit(s) receive engine operating parameters comprising at least one of crankshaft rotations per minute and current load on the engine, which can be sensed via vehicle sensors 1714. Knowing the current engine operating characteristics helps the control unit(s) decide timing of output signals, such as variable valve actuation, cylinder deactivation, and fuel injection signals. When the received engine power demand data is within one or more specified ranges, the control unit(s) determine a number of cylinders of the plurality of cylinders for deactivation based on the received engine power demand data and further based on sensed or stored friction values for the plurality of cylinders. This is part of method step 1901. Being in one or more specified ranges can comprise monitoring an engine operating mode and seeing at least one threshold range comprising one or more of an idle engine operating mode, a loaded idle engine operating mode, a coast mode, and a loaded engine operating mode. The cylinder combination of active cylinders and deactivated cylinders is adjusted based on whether the engine operating mode is the idle engine operating mode, the loaded idle engine operating mode, the coast mode or the loaded engine operating mode.

With the engine in range for CDA mode, the control unit(s) command that the determined number of cylinders of the plurality of cylinders be deactivated. As outlined in FIG. 4A, the intake valve controller (such as OCV1 & OCV2 or cylinder deactivation mechanism 7000) deactivates the respective intake valves for the determined number of cylinders in response to the command. The exhaust valve controller (such as OCV3 & OCV4 or cylinder deactivation mechanism 7000) deactivates the respective exhaust valves for the determined number of cylinders in response to the command. And, the injection controller 300 deactivates the respective fuel injectors for the determined number of cylinders in response to the command.

Figure 4A:
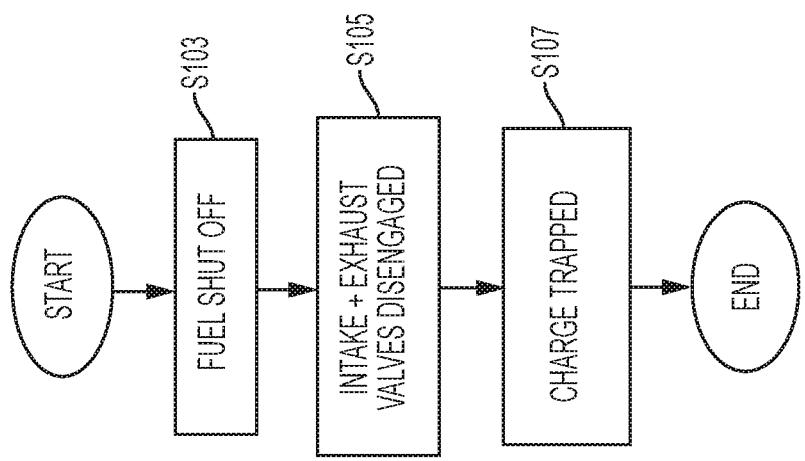
FIGS. 4A and 4B are flow diagrams for cylinder deactivation techniques.

FIG. 4A summarizes steps for entering cylinder deactivation. In step S103, fuel is cut off to a selected cylinder. In step S105, intake and exhaust valves are disengaged from actuation, whether by electric or hydraulic means, such as e-solenoid, electric latch, hydraulic latch, cam selection, disabling a controllable lift mechanism, a cam-camless actuator, a hybrid electro-hydraulic system, or like means. A quantity of intake flow is trapped in the deactivated cylinder and the example of step S107 of FIG. 4A traps a charge of air.

Respective intake valves for the determined number of cylinders can comprise a respective hydraulically actuated latch connected to their respective intake valve controller. The hydraulically actuated latch can be configured to deactivate and reactivate its respective intake valve. A failsafe operation can confirm the latch position by monitoring a hydraulic pressure against the hydraulically actuated latch. The hydraulically actuated latch can be replaced with a respective electrically actuated latch, and a failsafe operation can confirm the latch position by monitoring an electric signal to the electrically actuated latch.

Figure 4B:
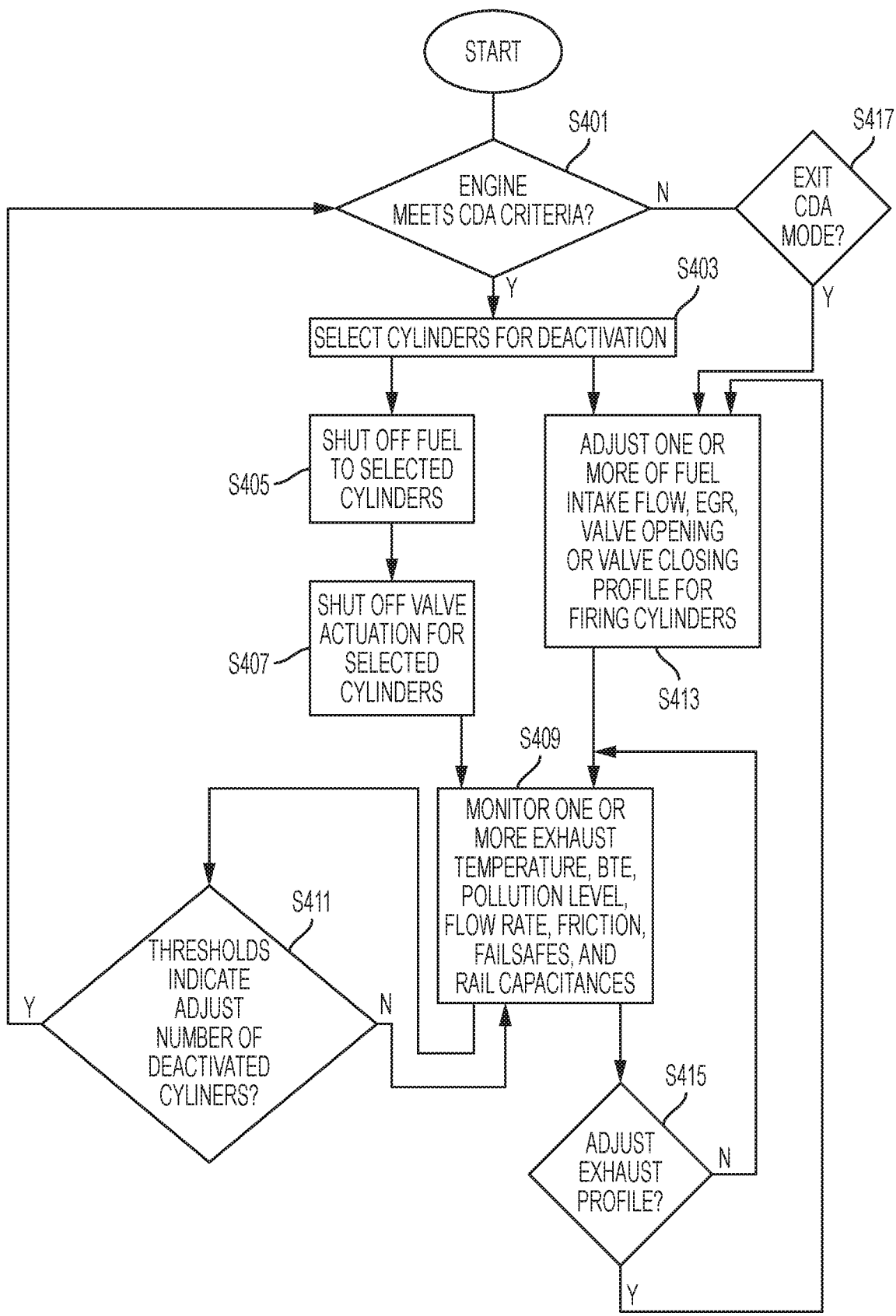

The method of FIG. 4A can be used alone to increase fuel efficiency and pollution control for an engine. But, FIG. 4B shows cylinder deactivation combined with additional control benefits. For example, when control unit 1700 or 2100 determines the number of cylinders of the plurality of cylinders for deactivation, a calculation is made to minimize friction between the plurality of cylinders and their respective reciprocating piston assembly. Comparative calculations enable selecting a cylinder combination of active cylinders and deactivated cylinders with the lowest total friction while meeting engine power demand. This is part of method step 1903. As an example, executing the friction determination to minimize friction can comprise knowing when the engine operating mode is the coast mode, and deactivating as many cylinders as feasible to further minimizing friction to extend the coast mode. When the engine mode is the coast mode, this can result in selecting a cylinder combination with the lowest total friction and a combination of zero active cylinders and all deactivated cylinders. Further, the engine operating mode can further comprise a platooning mode, and selecting the cylinder combination can be further based on minimizing friction to optimize platooning mode The set of control algorithms in the control units can be further configured to select the distribution of active cylinders and deactivated cylinders to minimize total friction between the plurality of cylinders 1-6 and their respective reciprocating piston 160. Once the number of cylinders of the plurality of cylinders for deactivation have been determined, the distribution of the deactivated cylinders can be determined in consideration of, for example, the rail set-up, the cylinder capabilities, whether the system is a static or dynamic CDA system (whether the selections can "walk" on the engine block), the cam position, crank position, stroke cycle position, etc. For example, the set of control algorithms can be further configured to dynamically assign the number of cylinders of the plurality of cylinders for deactivation over time and to dynamically adjust the distribution of active cylinders and deactivated cylinders so that, over time, the number and location of active cylinders and deactivated cylinders varies around the combustion engine.

The set of control algorithms is further configured to iteratively update the number of cylinders of the plurality of cylinders for deactivation over time. A new number of cylinders of the plurality of cylinders for deactivation can be determined based on updated engine power demand data and based on updated determinations of friction between the plurality of combustion cylinders and their respective reciprocating pistons. For example, as engine speed increases, friction between the piston assembly 160 and the cylinder increases, so it is beneficial to adjust the cylinder selection to reduce friction as much as possible as engine speed increases. Increasing fuel dosing to active cylinders can be a corollary to deactivating additional cylinders.

Returning to FIG. 4B, in step S401, the control unit(s), decides whether the engine load meets criteria for entering CDA mode. If the engine system meets CDA criteria, as by having an appropriate load or crankshaft RPM, or both, the computer control system selects the number of cylinders that can be deactivated while meeting current load and RPM requirements in step S403. Additional factors to consider are one or more of whether the exhaust temperature is within a threshold range or at a target temperature, whether the brake thermal efficiency (BTE) is above a BTE threshold, or whether the tailpipe emissions are within a range or at a target level. One strategy deactivates as many cylinders as possible without impacting the torque output of the engine. Another strategy deactivates as many cylinders as possible to maintain as high an exhaust temperature as possible. Another strategy deactivates as many cylinders as possible to have as fuel-efficient operation as possible. Yet another strategy minimizes friction. Another strategy monitors failsafe factors for executing failsafe subroutines. Yet another strategy monitors capacitances to minimize energy waste and maximize energy re-use. Querying criteria for executing these strategies is done in step S401, and failsafe, capacitance, friction, energy use, and fuel economy data can be considered, among other data.

Once the number of cylinders for deactivation are selected in step S403, the fuel injection controller 300 shuts off fuel to the selected cylinders in step S405. A concurrent or consequent adjustment of air fuel ratio (AFR) to the firing cylinders can be made in step S413. The amount of fuel injected in to the cylinders ranges from 0-100%, and is computer controllable by appropriate mechanisms, including sensors, transmitters, receivers, and actuators. Step S413 can additively or alternatively comprise adjusting one or more of the timing or quantity of fuel injection, intake flow, exhaust gas recirculation (EGR), valve opening or valve closing profile (lift or timing) for the firing cylinders. This can comprise the AFR tailoring strategies detailed above and can comprise compressor 512 or intake assist device 601 or exclude turbocharger 501 as appropriate. When the engine is a diesel engine, at least one set of control algorithms is further configured to adjust commands to the fuel injector to adjust the quantity of fuel injected to active cylinders of the plurality of cylinders based on an engine output requirement.

With fuel adjustments made, the intake and exhaust valve actuation is shut off for the selected, deactivated, cylinders in step S407. The system monitors one or more of exhaust temperature, brake thermal efficiency, pollution level, exhaust flow rate through the catalyst, etc. in step S409. If it is not possible to adjust the number of deactivated cylinders, the monitoring in step S409 continues, But, if it is possible to deactivate additional cylinders, step S411 determines to do so. For example, the thresholds for temperature, pollution, friction, energy re-use, heat soaking or flow rate could indicate that an increase or decrease in the number of cylinders in CDA would improve exhaust conditions. So, if the thresholds indicate that adjusting cylinders in CDA mode would benefit the target exhaust conditions, the method checks whether other parameters, such as load and RPMs, permit CDA mode by returning to step S401.

In one aspect, and returning to FIG. 5, an engine is generalized and labelled with 6 cylinders in a linear fashion for convenience. In practical implementation, the cylinders are not always linearly aligned. Even when they are, they are not always fired in the sequence numbered in the Figures. That is, the cylinders may not fire in the sequence 1, 2, 3, 4, 5, 6. For example, a firing sequence for an engine in normal operation mode can be 1, 5, 3, 6, 2, 4. In CDA mode, cylinders 4, 5, 6 are deactivated. The remaining cylinders fire in sequence 1, 3, 2. Depending upon where the engine is in its firing sequence, the cylinders selected for deactivation can change between algorithm iterations. So, a first iteration can fire as explained. A second iteration could shift the normal firing sequence to 3, 6, 2, 4, 1, 5. In this sequence, cylinders fire 3, 2, 1, while cylinders 4-6 are deactivated. However, the start sequence for implementing a new CDA mode deactivation sequence could activate deactivated cylinders, and deactivate firing cylinders. A sequence of 5, 3, 6, 2, 4, 1 would fire cylinders in sequence 5, 6, 4, with cylinders 1-3 deactivated. So, not only can the number of cylinders firing and deactivated change, but the cylinders selected for firing and deactivated can change between algorithm iterations.

Returning to the flow diagram, the results of step S409 can be analyzed and a determination can be made in step S415 to decide whether to adjust the exhaust profile. As above, to adjust aspects of the exhaust and its ability to heat the catalyst 800 or have pollution filtered from it, it can be necessary to adjust the engine activity at the cylinder level. And so, if the exhaust profile is to be adjusted, the algorithm returns to step S413. Otherwise, the system continues to monitor as in step S409.

It may be necessary to exit CDA mode altogether, in step S417, as when the load on the engine increases above a threshold. Or, as when the brake thermal efficiency or pollution control is better outside of CDA mode. As an additional example, it is possible to calculate a fuel usage for the selected cylinder combination, and to calculate a fuel usage for a cylinder combination comprising all active cylinders. Comparing the two calculations shows which is more fuel efficient: all-active cylinder mode or deactivated cylinder mode. Various calculations can comprise this determination, for example, calculations for more or less cylinders deactivated can be compared. Entering higher or lower transmission gears on the active and deactivated cylinders can be compared to the current state and to the determined state. Entering cylinder deactivation mode can be done when the calculations and comparisons show that the fuel usage for the selected cylinder combination is lower than the fuel usage for the all active cylinder cylinder combination.

The system checks whether the engine still meets criteria for implementing CDA mode by returning to step S401. If base criteria are not met, step S417 triggers an exit from CDA mode. The deactivated cylinders receive valve actuation control and fuel injection to return to firing mode. However, the algorithm can continue to check whether AFR adjustments or valve profile adjustments benefit the exhaust profile, as by continuing the flow through steps S413, S409, & S415.

Triggering conditions for entering, exiting, or delaying entering or exiting CDA mode can be as above, related to fuel economy, BTE, pollution management, etc. However, another issue is "critical shift." Critical shift can be understood looking at the cylinder deactivation examples in FIGS. 7A-9C and the plot of FIG. 14.

Figure 7A:
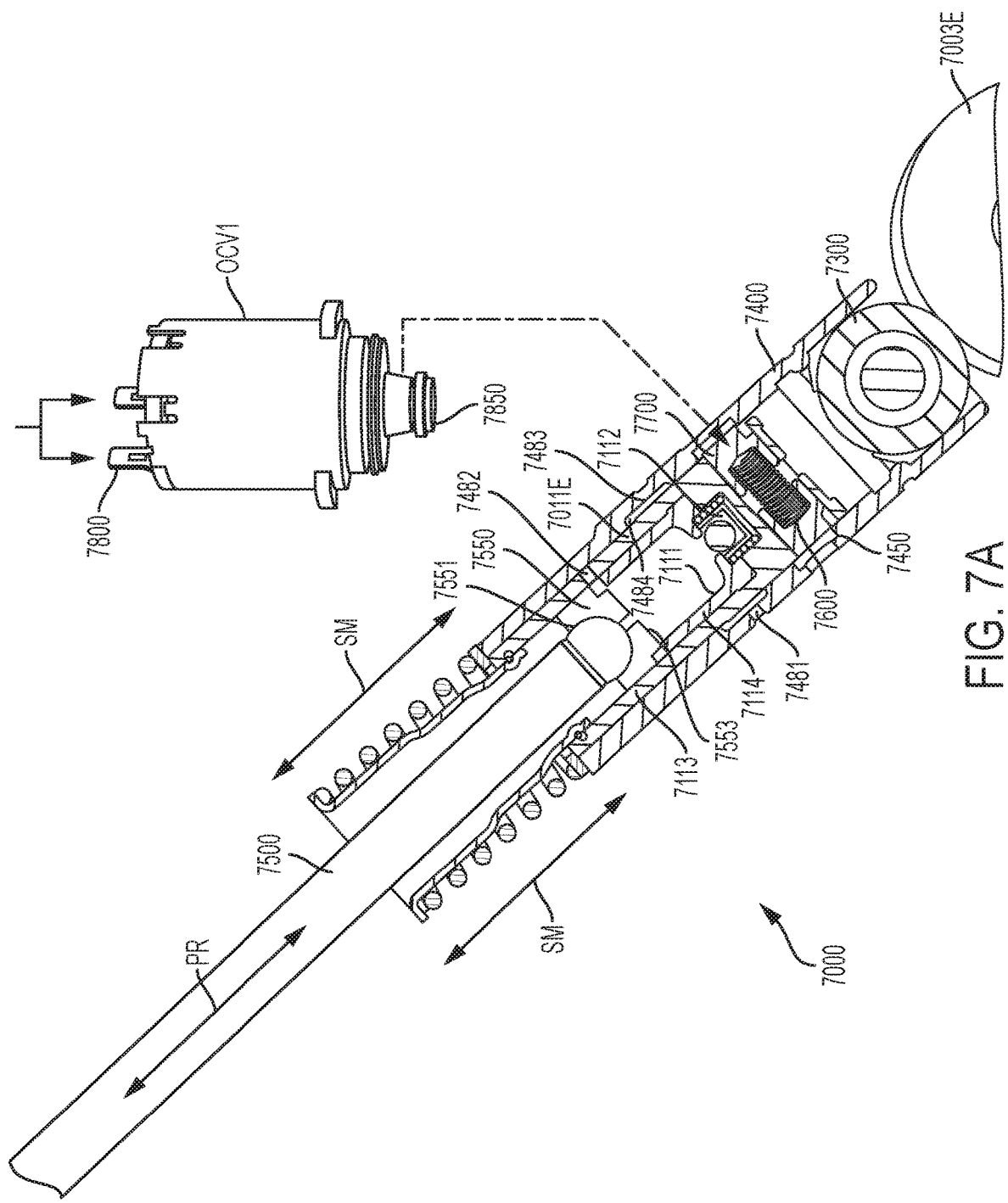
FIGS. 7A-7C are examples of a type-III engine cylinder deactivation mechanism.

Cylinder deactivation mechanism 7000 is for a Type V engine, and is shown in FIG. 1 rotated 90 degrees relative to the view shown in FIG. 7A. A cam lobe 7003E rotates against a bearing 7300 that is seated in sleeve 7400. A latch, or "pin" assembly, 7700 is biased by spring 7600 so that edges 7770 of the latch catch in recesses 7450 of sleeve 7400. In this default latched condition, no oil pressure is supplied from oil control valve OCV1, but for perhaps a steady state pressure. The pushrod 7500 seats within the sleeve 7400 on a crown 7550 that can be cupped on a first side 7551 to permit controlled sliding of the pushrod 7500 with respect to the sleeve. A second side 7552 can serve to cap pressurized hydraulic fluid within a first chamber 7111 of hydraulic lash adjuster 7011E. A metered port 7553 can vertically pass through the crown 7550 to provide lubrication to the pushrod on the cupped side. Or, a metered port 7555 can be angled through the crown 7550 to an alternative lubrication port 7554. A pressurized port 7481 can be included through the sleeve 7400 to provide hydraulic fluid to adjust the lash. Fluid can traverse, for example, groove 7483 in the sleeve, stepped surface 7484 on the lash housing 7113, port 7482 through the lash housing 7113, and a gap between the crown 7550 and an inner lash cup 7114 to enter first and second chambers 7111, 7112 of an optional hydraulic lash adjuster (HLA) 7011E built within the sleeve 7400. Second chamber 7112 can comprise lash adjusting features, such as a ball in a cage biased by a spring to meter a lash port between the first and second chambers, so as to control the sponginess of the HLA. The cam lobe 7003E has an eccentric profile that lifts and lowers the affiliated valve 1E via pushrod 7500. In the latched condition, the pushrod 7500 moves with the sleeve 7400 according to sleeve motion arrows SM. But, when hydraulic fluid is applied to the latch 7700 via the oil control valve OCV1, by energizing electrodes 7800 to open the valve (via solenoid, spool, or other means), the latch overcomes the spring force of spring 7600 and the latch 7700 collapses inward. Then, the pushrod 7500 reciprocates inside sleeve 7400 according to pushrod arrow PR, and the cam lobe profile does not lift or lower valve 1E. The cam motion is "lost." The latch 7700 can be integrated in to the lash housing 7113, as by including one or more latch cavities 7002 therein. As by comparing FIGS. 1 & 7A, cross-drilling or another technique can be used to form latch cavities 7002. A leakdown port 7701 can be included in the lash housing to fluidly communicate an amount of fluid between a latch cavity and bearing 7300 to lubricate one or more aspects of bearing 7300 or of the bearing to cam lobe 7003E interface. In one alternative, the bearing 7300 can be substituted with a flat tappet style terminus for the terminus of the cylinder deactivation mechanism.

Figure 7B:
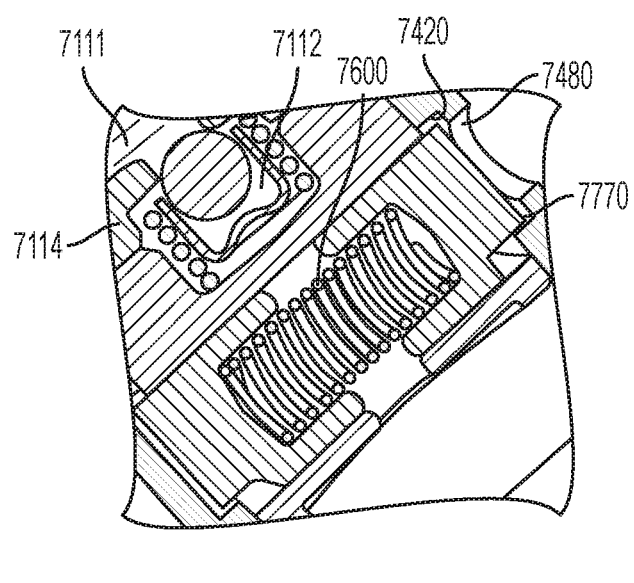
Figure 7C:
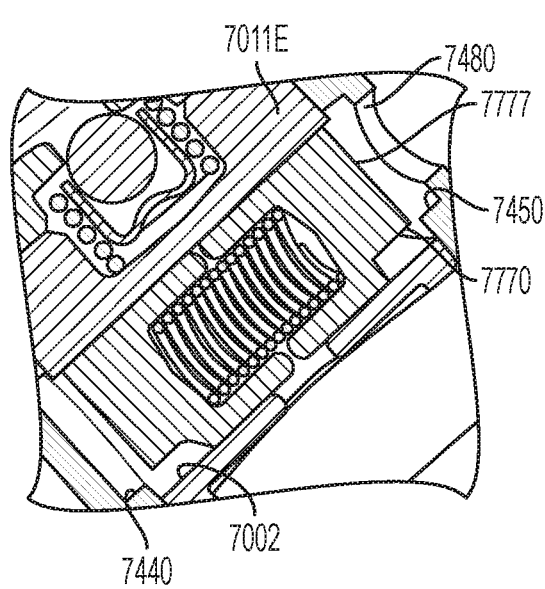

FIGS. 7B & 7C show the latch 7700 in more detail. Oil port 7480 fluidly communicates with oil control valve OCV1. Oil pressure against the face 7777 of the latch 7700, and within a cavity 7420 circumscribing the latch 7700 collapses the latch. The edges 7770 of the latch are no longer in recesses 7450.

If the timing of the latch 7700 motion is not considered with respect to the location of the cam lobe, a critical shift occurs. If the edges 7770 of the latch are only partially engaged in recesses 7450, it is possible for the latch 7700 to slip out of the recesses 7450. The valve can then drop suddenly, and piston contact can occur. Or, the pushrod can be damaged by the sudden motion. Either can severely damage the engine.

Figure 8A:
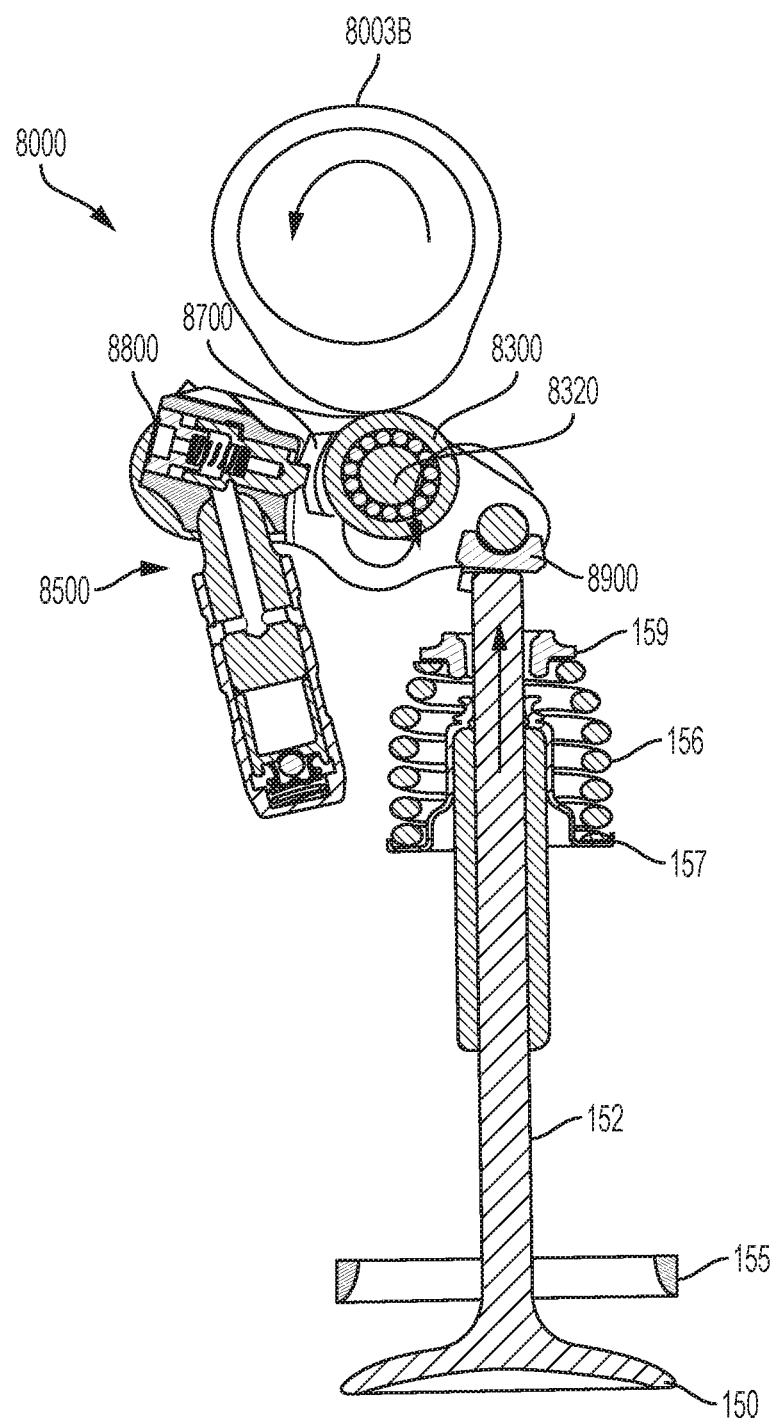
FIGS. 8A & 8B are examples of a type II engine cylinder deactivation mechanism.
Figure 8B:
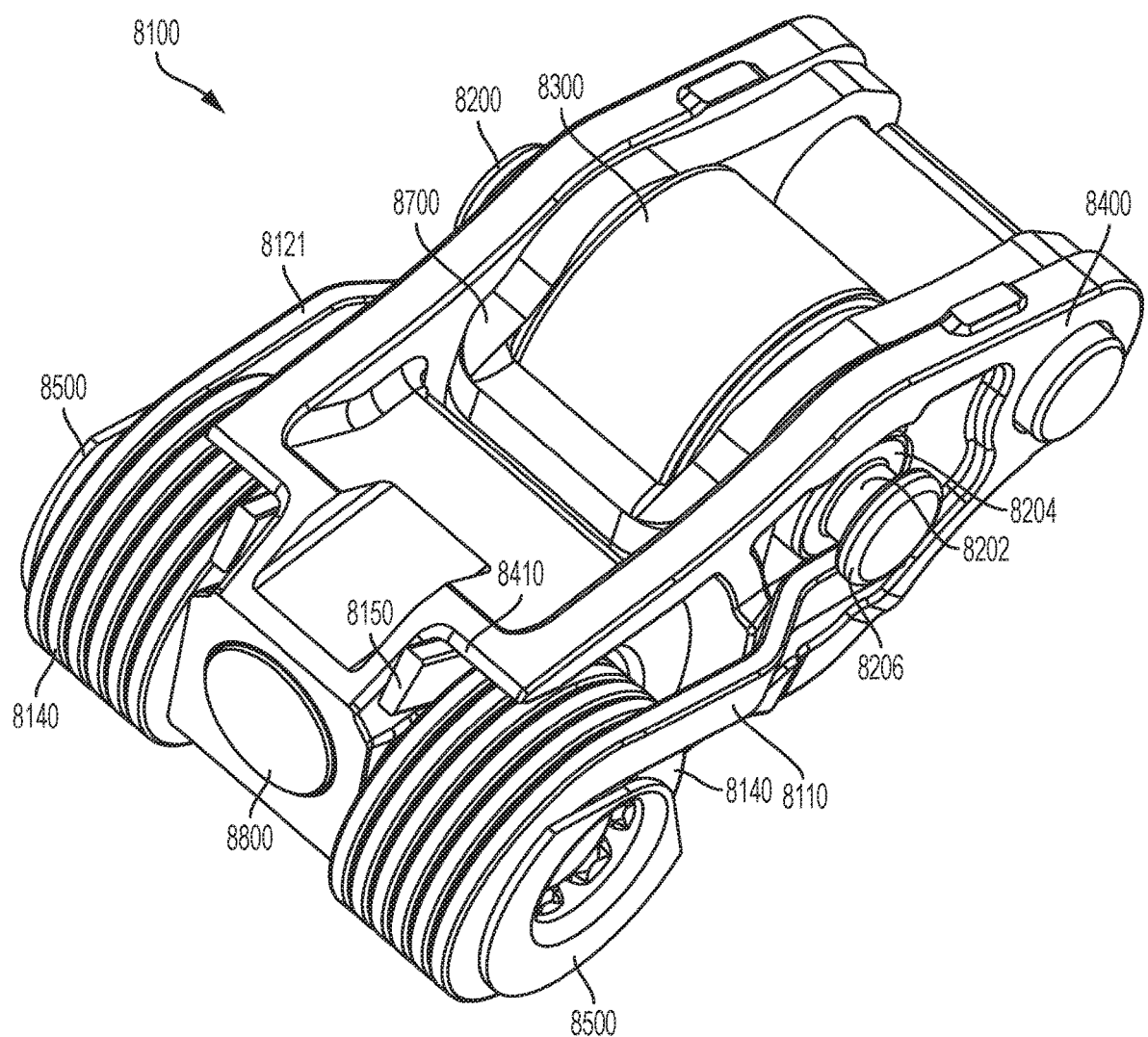

A type II engine cylinder deactivation mechanism is shown in FIGS. 8A-9C. In FIG. 8A, the eccentric cam lobe 8003B is overhead with respect to the cylinder deactivation mechanism 8100 and the valve 150. A portion of the exhaust port 155 is shown near the valve head of valve 150. Valve stem extends to a stem seat 8900 on the cylinder deactivation mechanism 8100. A spring 156, spring seat 159, and collar 157 help bias the valve 150. A hydraulic lash adjuster (HLA) 8500 is included to adjust lash from the valve. The HLA 8500 can share fluid pressure with the latch 7700 via port 8853 in sleeve 8850. HLA 8500 seats in HLA recess 8855.

A bearing 8300 rotates on a bearing axle 8320, and the cam lobe 8003B rotates on the bearing 8300. When the edge 8810 of latch 8870 catches against a recess 8710 of rotating arm 8700, the cam lobe 8003B pushes the valve 150 up and down by rotating with respect to the bearing 8300. A spring 8860 is biased between a plug 8840 and the latch 8870 to the latched condition. The plug includes an oil port 8830 for interfacing with an oil control valve OCV.

The bearing axle 8320 can be integrally formed with an extension 8200. The bearing axle 8320 receives biasing force from springs 8140 via arms 8110 and 8150. Spring 8140 is retained by retainer 8500. Arm 8150 is seated against ledge 8410. The spring force biases the bearing 8300 in contact with the cam lobe 8003B.

If the timing of entering or exiting cylinder deactivation mode is not tailored with respect to the cam lobe rotation, the edge 8810 will only be partially engaged with recess 8710. The latch 8870 could slip with respect to the inner arm 8700, or the arm 8700 can slip with respect to the latch 8870. This motion is referred to as a critical shift, as it can critically damage the engine, as by enabling valve contact with the piston, or from harsh travel of the inner arm 8700 with respect to the cam lobe 8003B. Avoiding a critical shift also avoids "clipping" the latch 7700 or 8870 and causing damage to the latch efficacy.

The type II and Type V cylinder deactivation mechanisms are exemplary only, and other cylinder deactivation mechanisms can be used with the systems and methods disclosed herein. Alternatives applying to engine Types I, III & IV are also within the applicability of the disclosed systems and methods.

Figure 14:
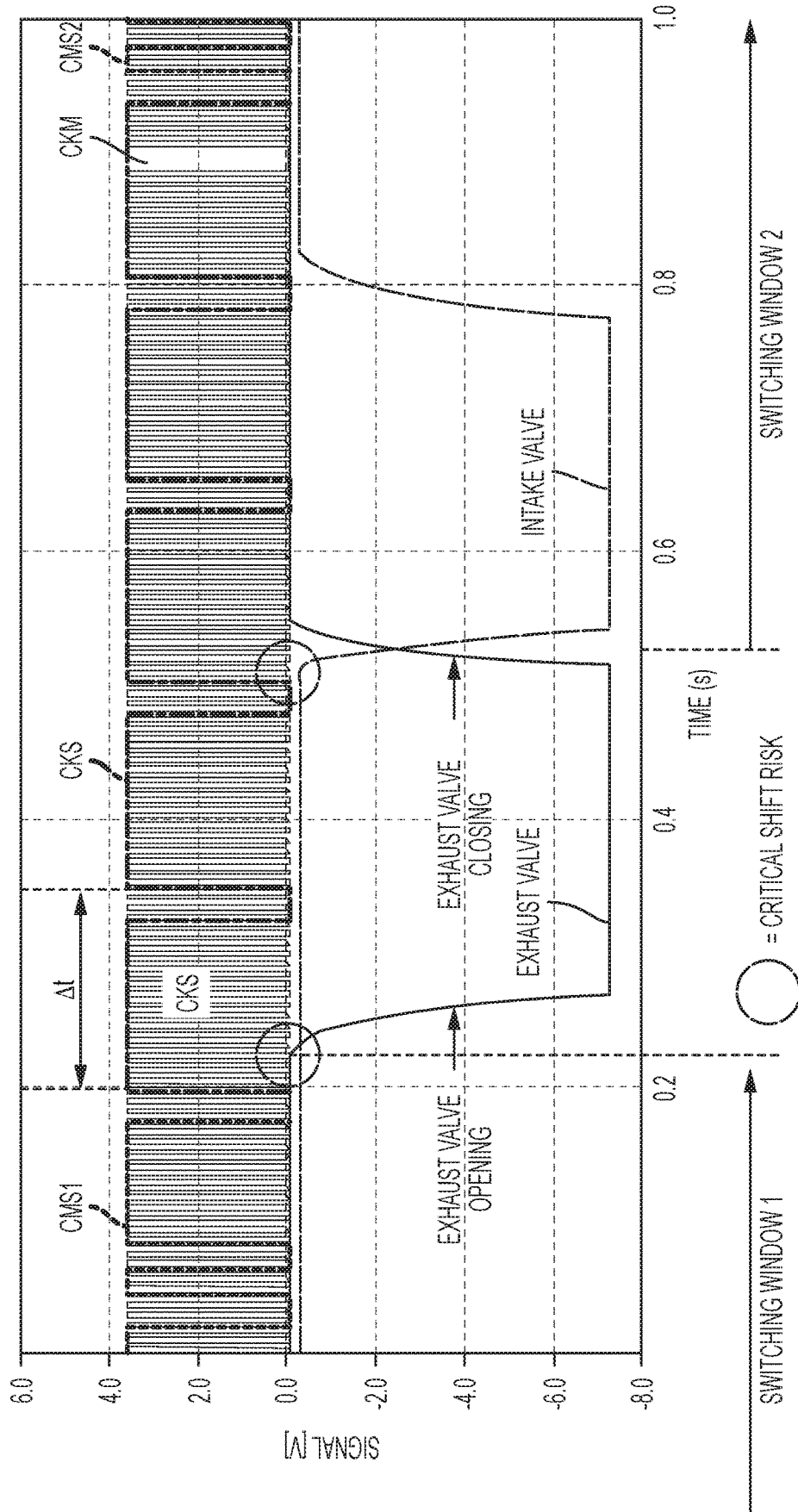
FIG. 14 is a plot of valve lift profiles with respect to camshaft and crankshaft profiles.
Figure 15:
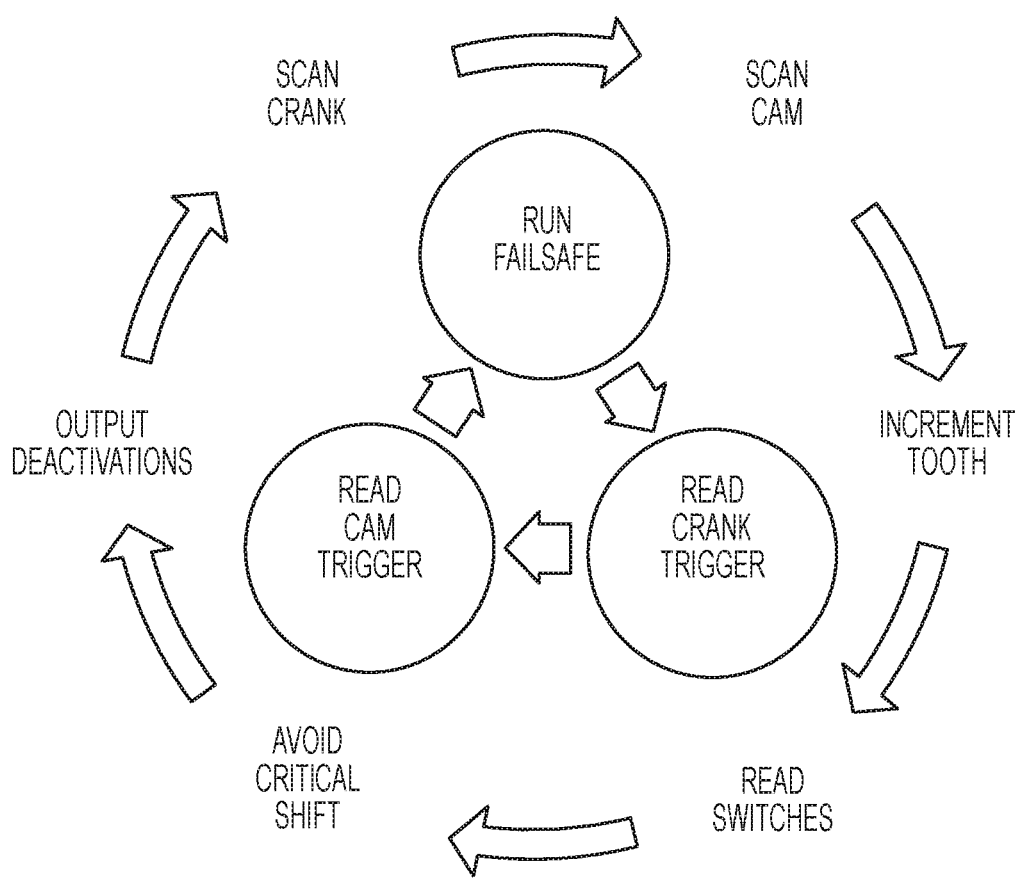
FIG. 15 is a flow diagram of a method for implementing a failsafe subroutine during a cylinder deactivation decision.

Avoiding critical shift can be understood with respect to FIGS. 14 & 15. Cam shaft sensor CM1 and crankshaft sensor CK1 can be Hall effect or other sensors to track teeth on the cam shafts 181, 182 and crank shaft 101. The individual teeth are plotted horizontally along a time axis. By tracking missing teeth, such as missing crank shaft tooth CKM, or by detecting large or small teeth, such as CMS1 & CMS2 on the cam shaft, the ECU 1700 and CDA controller 1800 can track the activity of the engine cycle and can know where the piston is in the cylinder and can know where the cam lobes are with respect to the deactivation mechanisms. Tracking the missing or disparately sized teeth, and knowing the timing between teeth permits a straightforward tracking mechanism. The critical shift locations are circled in FIG. 14. Initiating cylinder deactivation within the circled time periods gives the risk that the latch will slip out of its recess and cause a critical shift event.

To avoid the critical shift event, cylinder deactivation controller 1800 commands that a failsafe subroutine be executed to avoid a critical shift risk associated with the timing of the deactivation of the respective intake valves and the respective exhaust valves. Cylinder deactivation controller 1800 commands a failsafe subroutine comprising the step of verifying that the respective exhaust valves for the determined number of cylinders are in a switching window between a prior exhaust valve closing and prior to an exhaust valve opening command. Another aspect of a failsafe subroutine can comprise the step of verifying that the respective exhaust valves for the determined number of cylinders are in a switching window outside of an exhaust valve opening event. To protect the exhaust valves, a cylinder deactivation command can be issued during switching window 1 or 2, but once the exhaust valve opening has begun, the next switching window does not start until the intake valve has begun to lift. A non-deactivation window then exists between the exhaust valve opening command through to partial exhaust valve lowering.

Entering deactivation mode with respect to the respective intake valves of the selected number of cylinders can occur in a switching window after an intake valve opening command and prior to closing in succession of the intake valve opening command of the respective intake valves of the selected number of cylinders. Entering deactivation mode with respect to the respective intake valves of the selected number of cylinders can occur in a switching window after an intake valve opening command and prior to any fuel injection in to the respective intake valves of the selected number of cylinders. When, reactivating the selected number of cylinders, reactivating comprises commanding the opening of the exhaust valves for the selected number of cylinders prior to commanding the opening of the intake valves for the selected number of cylinders. Entering cylinder deactivation mode in the selected number of cylinders occurs when respective intake valves and respective exhaust valves of the selected number of cylinders are closed.

In other alternatives, the command to deactivate the determined number of cylinders can be timed to occur after respective exhaust valves of the determined number of cylinders have opened and closed, and after respective intake valves of the determined number of cylinders have begun opening, but prior to the respective intake valves of the determined number of cylinders having closed. Also, the command to deactivate the determined number of cylinders can be timed to occur after respective exhaust valves of the determined number of cylinders have opened and closed, and after respective intake valves of the determined number of cylinders have opened and begun closing, but prior to the respective fuel injectors of the determined number of cylinders having injected fuel.

A failsafe can include the step of verifying that the respective exhaust valves for the selected number of cylinders are in a switching window between a prior exhaust valve closing and prior to an exhaust valve opening command. An alternative step of verifying that the respective exhaust valves for the selected number of cylinders are in a switching window outside of an exhaust valve opening event. Also, a failsafe subroutine can comprise the step of verifying that the respective intake valves for the determined number of cylinders are in a switching window after an intake valve opening command.

The step of entering cylinder deactivation mode can be timed to occur after respective exhaust valves of the selected number of cylinders have opened and closed, and after respective intake valves of the selected number of cylinders have begun opening, but prior to the respective intake valves of the selected number of cylinders having closed. The step of entering cylinder deactivation mode can be timed to occur after respective exhaust valves of the selected number of cylinders have opened and closed, and after respective intake valves of the selected number of cylinders have opened and begun closing, but prior to respective fuel injectors of the selected number of cylinders having injected fuel.

Additionally, the failsafe subroutine can comprise the step of verifying that the respective intake valves for the determined number of cylinders are in a switching window after or outside of an intake valve opening command. By waiting until intake valve lift has begun, the latch cannot slip out of the recess, as the lift event clamps the latch in place. If a deactivation signal is given to move the latch 8870 or 7700, loss of oil pressure from the oil control valve OCV1 will not cause the latch to retract out of the recess, because the latch is clamped by the force of the lift event. Even an electronically actuated latch, which is a contemplated alternative embodiment, cannot move out of the recess due to the clamp force during lift. So, a method of controlling a cylinder deactivation mechanism can comprise executing a valve lift event configured to lift a valve via a pushrod and rocker arm combination, wherein the pushrod is coupled via a sleeve with a controllable latch in a latched condition, wherein the controllable latch is configured with edges that are clamped in recesses of the sleeve during the valve lift event, a clamp force supplied in part by pressure from the pushrod. A deactivation signal can be sent to select the unlatched condition to collapse the latch from the recesses while the controllable latch is configured with edges that are clamped in recesses of the sleeve. Deactivating actuation of the valve can be achieved by collapsing the latch from the recess once the valve lift event is complete and the clamp force supplied in part by pressure from the pushrod diminishes.

The peaks for the exhaust valve lift event and the intake valve lift event are shown with respect to voltage readings of a proximity sensor. The proximity sensor gives clipped peaks due to the location of the sensor and the shape of the valves.

In lieu of multiple teeth readings, another alternative contemplates tracking the location of the piston assemblies 160. Or, the teeth readings can be translated in to piston location data to monitor the location of the piston assemblies 160. Avoiding a critical shift risk with respect to the reactivation of the intake valves can then comprise monitoring respective piston locations relative to the deactivated intake valves and initiating reactivation when the respective piston locations indicate that the respective pistons have left top dead center of the selected number of deactivated cylinders. Avoiding a critical shift risk with respect to the reactivation of the exhaust valves can comprise monitoring respective piston locations relative to the deactivated exhaust valves and initiating reactivation when the respective piston locations indicate that the respective pistons have left bottom dead center of the selected number of deactivated cylinders.

Figure 11:
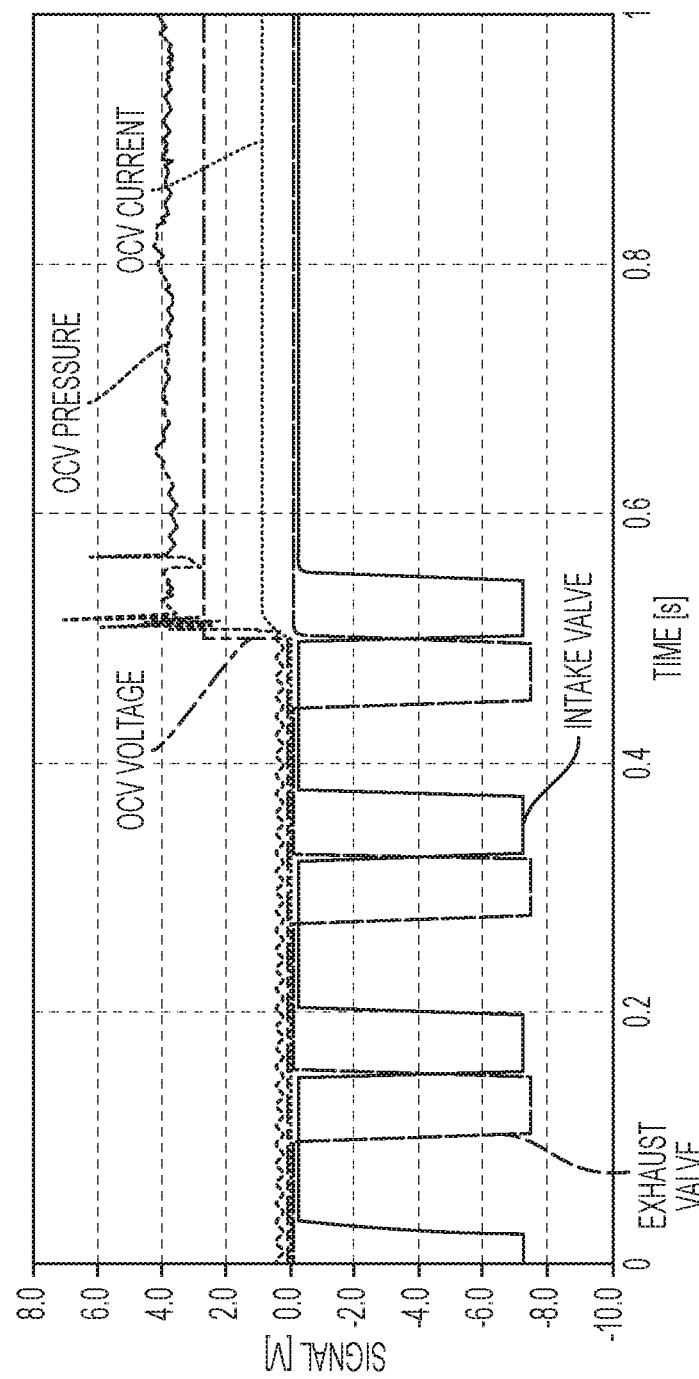
FIG. 11 is a plot of deactivation signals.

FIG. 11 shows that a voltage can be applied to leads 7800 to cause oil pressure from port 7850 to pressurize latch 7700. The voltage can be applied in the second switching window, just after intake valve lift has begun, and just before the exhaust valve has fully closed. With the latch 7700 clamped in the recess, between the HLA 7011E and the sleeve 7400, oil pressure quickly builds, as indicated by the sharp peak. Clamp force can be supplied from the cam lobe 7003E pushing the cylinder deactivation mechanism upward and the pushrod PR opposing the upward motion. The OCV pressure drops slightly when the latch moves to the unlatched condition, and then pressure builds again before stabilizing during deactivation. The OCV current ramps up quickly after the OCV voltage signal is issued. Building pressure in this way permits fast latch response time, and can be part of the energy waste calculations.

Figure 21:
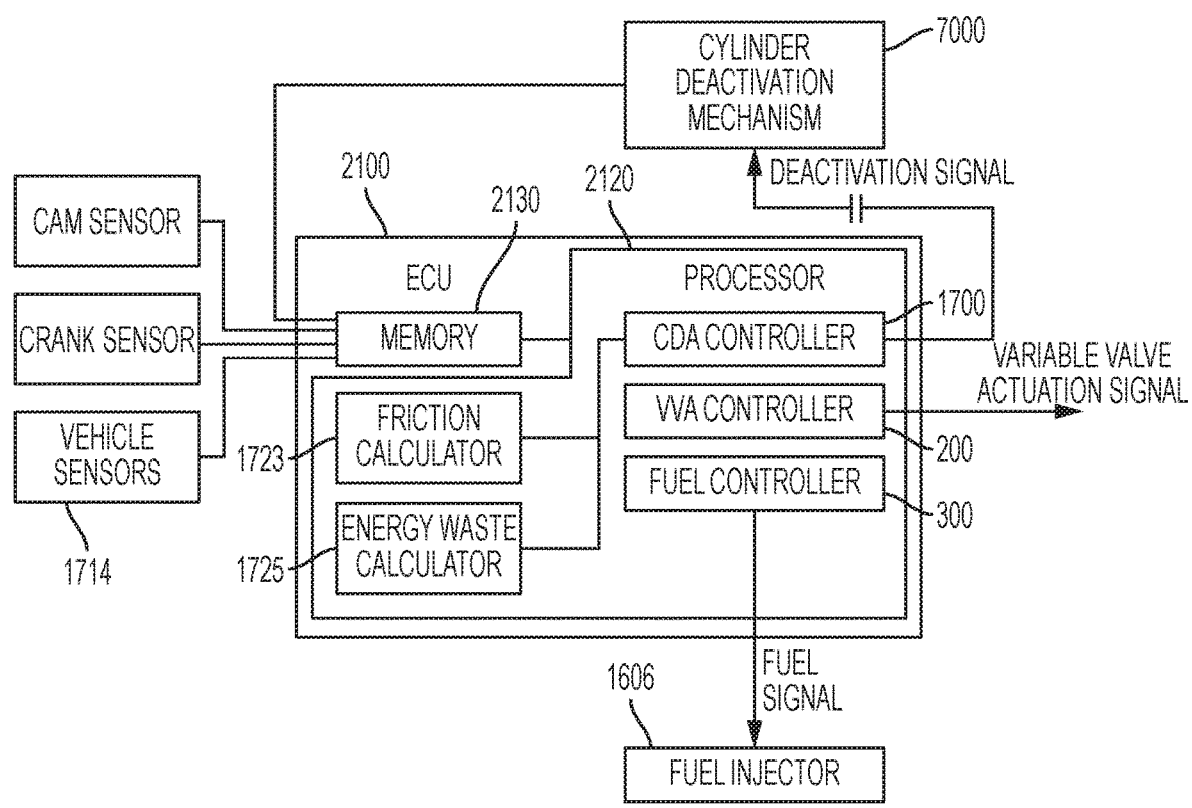
FIG. 21 is another schematic of an engine electronic control unit and system layout.

By including a capacitive device on the OCV control rail, faster response times can be had while reducing energy waste. FIGS. 16 and 21 show a capacitor leading to the OCVs & cylinder deactivation mechanisms 7000. Having an electronic latch in the cylinder deactivation mechanism 7000, or the electrically controlled hydraulics, makes the system more responsive. The cylinder deactivation mechanisms can be arranged individually, or in rails, such as the pairs OCV1 & OCV2 and OCV3 & OCV4 shown in FIG. 3A. The rails of the cylinder deactivation mechanisms can be configured to deactivate and reactivate the intake valves and the exhaust valves. The deactivation command can be an electric signal having an energy level. The rails comprise the electric energy storage device, such as a capacitor, and the energy storage devise is configured to store a portion of the command's energy level. The storage of a portion of the command's energy level reduces energy waste in the system, because the excess energy is put to good use (faster response time) during the next command. So, determining a number of cylinders can be further based on reducing energy waste in the system. The controller unit is configured to select a cylinder combination that maximizes use of stored command energy level by repeatedly selecting deactivated cylinders associated with stored command energy during iterative determinations.

During reactivation, the cylinder deactivation controller 1800 commands the reactivation of the deactivated intake valves and the deactivated exhaust valves. The cylinder deactivation controller 1800 further commands that a failsafe subroutine be executed to avoid a critical shift risk associated with the timing of the reactivation of the respective intake valves and the respective exhaust valves.

Figure 13:
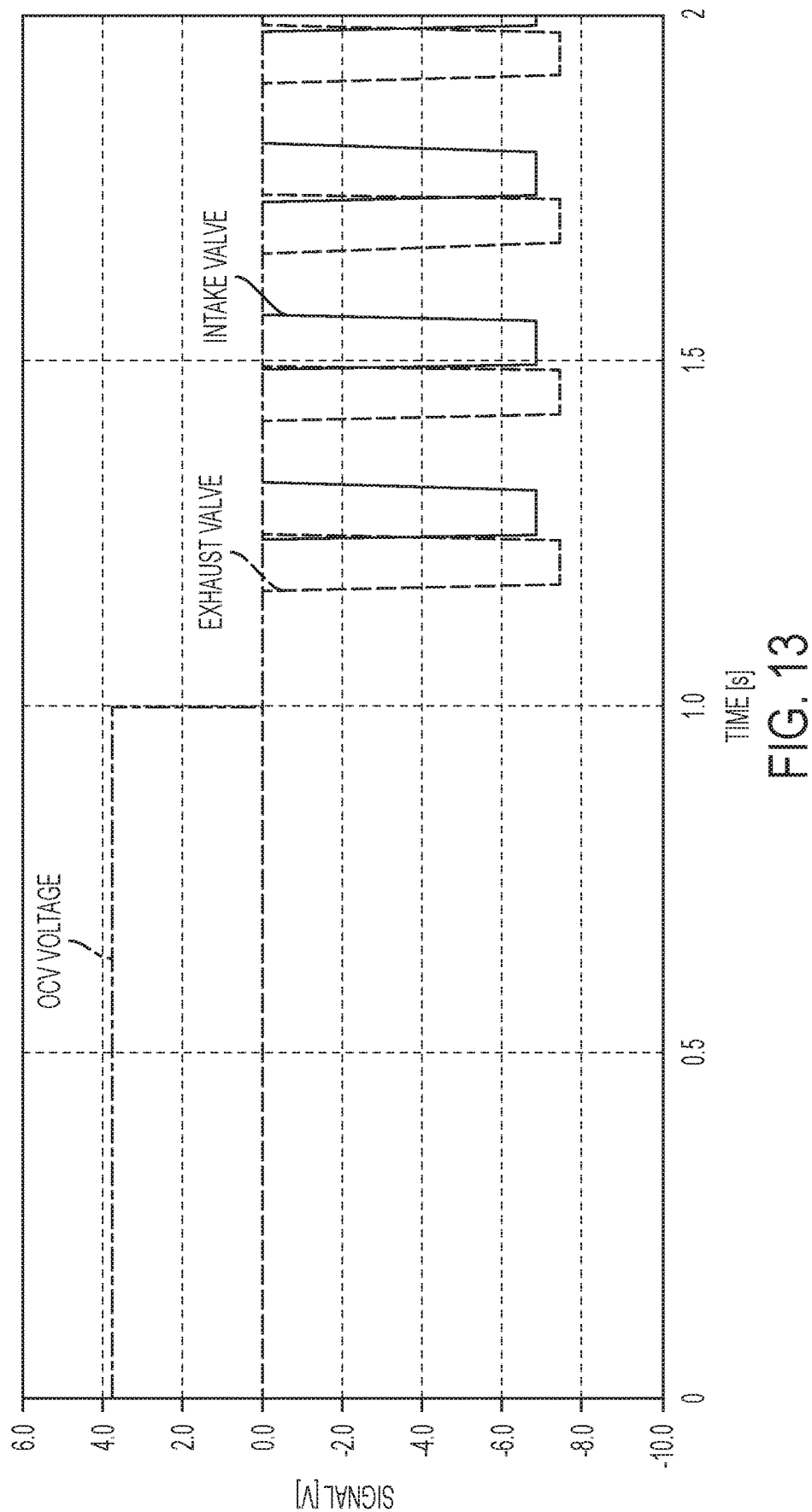
FIG. 13 is a plot of reactivation signals.

As seen in FIG. 13, the OCV voltage is terminated at a time when neither the exhaust valve nor intake valve can initiate lift, nor can they contact piston assemblies 160. This also avoids "clipping" the latch 7700 or 8870 against the recess 7450 or 8710. Timing the reactivation signals appropriately therefore avoids a critical shift, and a failsafe subroutine is executed therefor.

Preliminary and interrupt protocols are shown in FIG. 15. In the outer ring, the primary protocol indicates that, iteratively, the crankshaft teeth are scanned and the camshaft teeth are scanned. The location of each shaft is determined in accordance with the principles of FIG. 14. Having located both camshaft and crankshaft positions via the teeth readings, the primary protocol confirms that necessary engine information is known, such as one or more of the engine cycle, the valve positions, and piston positions. Engine speed can also be solved for. The ECU 1700 and CDA controller 1800 have on-board information for confirming the teeth information. Data received from the cam and crank sensors CM1 and CK1 can be compared against known data, and once positions are confirmed, the protocol can increment the tooth and scan for the next expected tooth pattern. Incorporating the deactivation commands, which can be signals issued from the ECU 1700 or manual inputs from the user, as by switches, the protocol considers if the current engine status is compatible with the deactivation commands. The timing of deactivation is confirmed or delayed to avoid a critical shift. The deactivation commands are then output to the cylinder deactivation mechanisms 7000, OCVs, etc.

An interrupt protocol in the center cycle initiates a "hold" on engine behavior if a crankshaft or camshaft tooth reading triggers the interrupt protocol. For example, if no tooth is detected, for either or both of camshaft and crankshaft, for a select time period, this is a trigger that is read by the interrupt protocol to require a hold status command. The hold is issued to prevent shifts in engine behavior. Likewise, running a failsafe can trigger the interrupt protocol to issue a hold status command.

FIGS. 16 and 21 show alternative control unit and system layouts. In FIG. 16, a control unit comprises an engine control unit 1700 separate from a cylinder deactivation controller 1800. Each comprise at least one processor 1720, 1820, at least one memory device 1730, 1830, and at least one set of processor-executable control algorithms stored in the at least one memory device. The engine control unit 1700 determines the number of cylinders of the plurality of cylinders for deactivation based on engine power demand data received at the engine control unit. Engine power demand data can come from vehicle sensors 1714 and can be derived from the operating conditions 1735 stored based on the vehicle sensors 1714. Vehicle sensors 1714 can sense many things, such as acceleration, deceleration, engine operation mode, user inputs, stability system parameters, etc. Cam sensor 1710 and crank sensor CK1 can be the Hall effect sensor CM1 or CK1 of FIG. 3A or another type of sensor, such as optical, magnetic, electric, etc. Cam sensor 1710 and crank sensor 1712 feed data to both ECU 1700 and CDA controller 1800 to build real time cam tooth data and crank tooth data to compare to stored cam tooth data 1731, 1831 and crank tooth data 1733, 1833.

ECU 1700 processes the stored data to perform fuel injection control (timing, quantity, cylinder deactivation, etc) in fuel injection management module 1720. Output from the module is sent to fuel controller 300, which can communicate in two ways to assist with failsafe determinations.

ECU 1700 also performs friction calculations in friction calculator 1723. And, performs waste energy calculations in energy waste calculator 1725. The results of the two calculators is fed to a combiner 1740, along with fuel injection management outputs, to result in an ultimate cylinder deactivation command to send to the CDA controller. The combiner 1740 can compare results of the calculations to determine the optimum use of fuel by the engine. The CDA controller 1800 returns data to the ECU 1700 for further processing, such confirming that the respective intake valves and the respective exhaust valves have been deactivated for the determined number of cylinders. The deactivation confirmations or other feedback to the ECU can ensure continued engine operation.

In the cylinder deactivation controller 1800, cam calculator 1823 processes the stored and real time cam data and compares them to discover the camshaft position and to solve for other information, such as lobe position, valve open or close position, etc. Crank calculator 1825 processes the stored and real time crank data and compares them to discover the crankshaft position and to solve for other information, such as piston assembly 160 location, stroke cycle position, etc. The solved information is fed to a failsafe calculator 1827 to check for interrupt protocol triggers, among other failsafe subroutines. An OCV feedback signal 1714 from the OCVs can be stored as OCV status data 1837, and this can be forwarded to the failsafe calculator for processing. Latch position can be solved for, or line pressure can be considered. The ECU 1700 issues cylinder selections 1839, which can be stored in the memory and forwarded for failsafe checking. After failsafe calculator checks the commands and decisions, an output processor formulates the final signal for the cylinder deactivation mechanisms, here OCVs.

Comparing FIGS. 16 and 21, a network of elements are shown in FIG. 16, while a consolidated structure is shown in FIG. 21. In FIG. 16, the cylinder deactivation controller receives the command that the determined number of cylinders of the plurality of cylinders be deactivated from the electronic control unit 1700, and the cylinder deactivation controller 1800 implements deactivation of the respective intake valve and the respective exhaust valve of the determined number of cylinders. Also, cam sensor CM1 and crank sensor CK1 send data to the ECU 1700 for processing, as above. A signal conditioning board 1602 interrupts the sensor data to make the sensed data compatible for the CDA controller to use. A communication circuit 1604 formats the CDA controller deactivation signal to be compatible with the OCVs, and also prepares the formatted deactivation signal to be compatible with the capacitive storage device C. The feedback from the OCVs is fed to the signal conditioning board 1602 so that the CDA controller 1800 can process the feedback.

FIG. 16 also includes an alternative failsafe subroutine for confirming that the fuel to a fuel injection controller 1606 has been turned off. It is possible to require fuel injection shut off prior to valve deactivation to ensure no wall-wetting or other negative fuel uses occur as a result of a deactivation command. In yet another alternative, the fuel shut-off confirmation can be sent to the CDA controller 1800 and included in failsafe subroutine processing.

The alternative layout of FIG. 21 consolidates the computing to form a more robust, and less network ECU 2100. The memory 2130 receives data from cam sensor CM1, crank sensor CK1, and vehicle sensors 1714. Here, the processor includes allocation programming to form multiple on-board subroutines for data processing. A friction calculator 1723 and energy waste calculator 1725 feed results to CDA controller 1700 for cylinder selections and formulation of deactivation commands. A variable valve actuation (VVA) controller 200 assembles a variable valve actuation signal for strategies such as early intake valve opening (EIVO), late intake valve closing (LIVC), early exhaust valve opening (EEVO), etc. The fuel controller 300 is also incorporated in to the ECU 2100, and sends the fuel signal to the fuel injector controller 1606.

Figure 19:
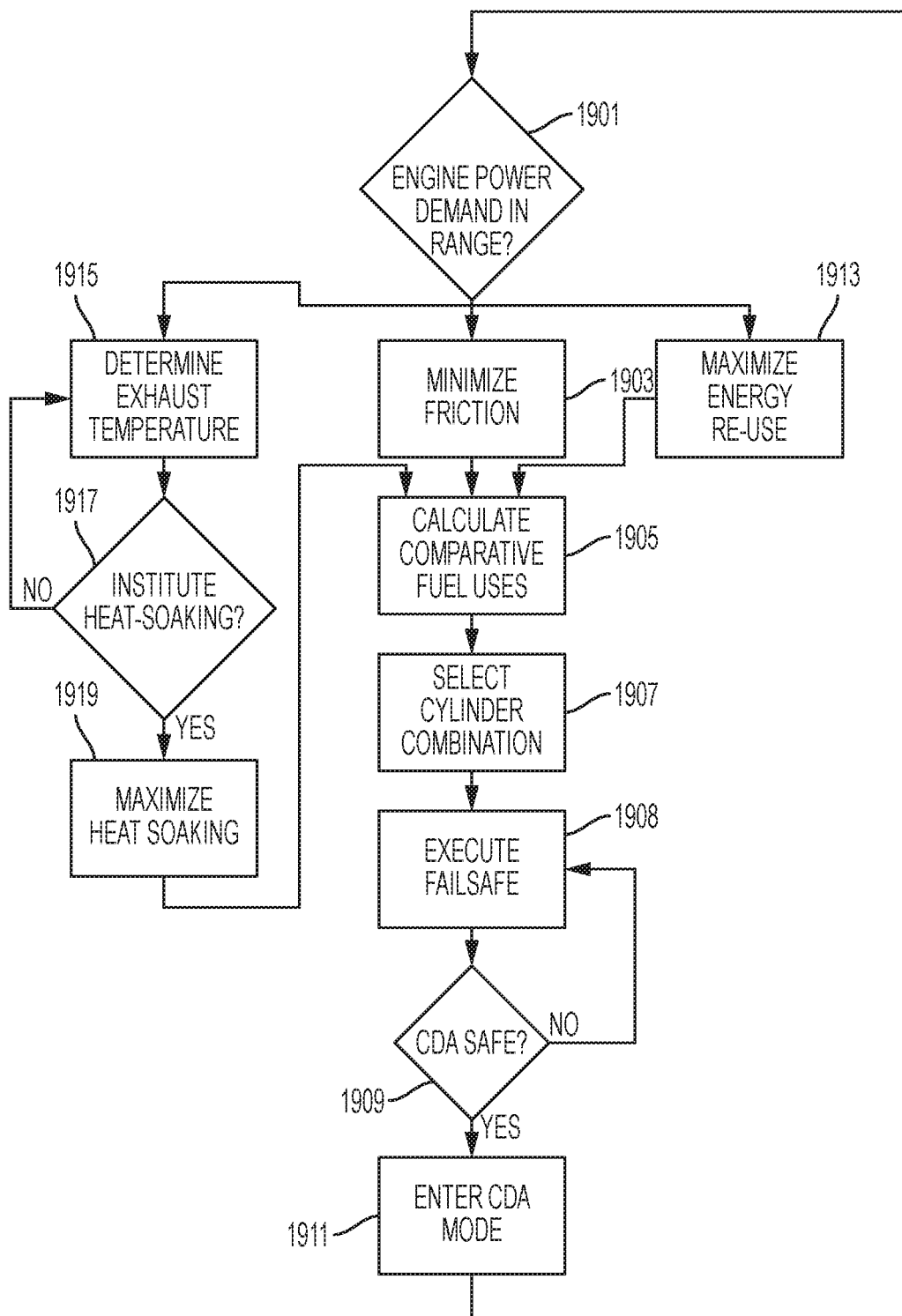
FIG. 19 is an example of a flow diagram for entering cylinder deactivation mode.

FIG. 19 shows a decision tree for entering CDA mode and selecting cylinders for deactivation. When the engine power demand is in range of CDA mode, as determined in step 1901, three events can happen. In one stream, the exhaust temperature is determined in step 1915. A heat-soaking decision can be made in step 1917. If heat-soaking is desired, CDA mode is optimized to provide maximum heat to the exhaust system in step 1919. In another stream, friction is minimized in step 1903 by implementing the considerations of FIGS. 12A and 12B. Also, maximum energy re-use is determined in step 1913, as by considering the capacitive storage device C. Three outputs are sent to calculate comparative fuel uses in step 1905. Here, as above, comparing the several calculations shows which is more fuel efficient, and the comparative calculation can further include the above comparison to all-active cylinder mode with and without changes to gear selections. A cylinder combination is selected in step 1907. One or more failsafes are executed in step 1908, detailed more in FIG. 20. If CDA mode is safe, then the deactivation commands are issues and the engine enters CDA mode in step 1911. If CDA is not safe, then the process can return for failsafe processing, such as adjustments to timing, or the process can return to a higher step in the flow diagram.

Figure 12B:
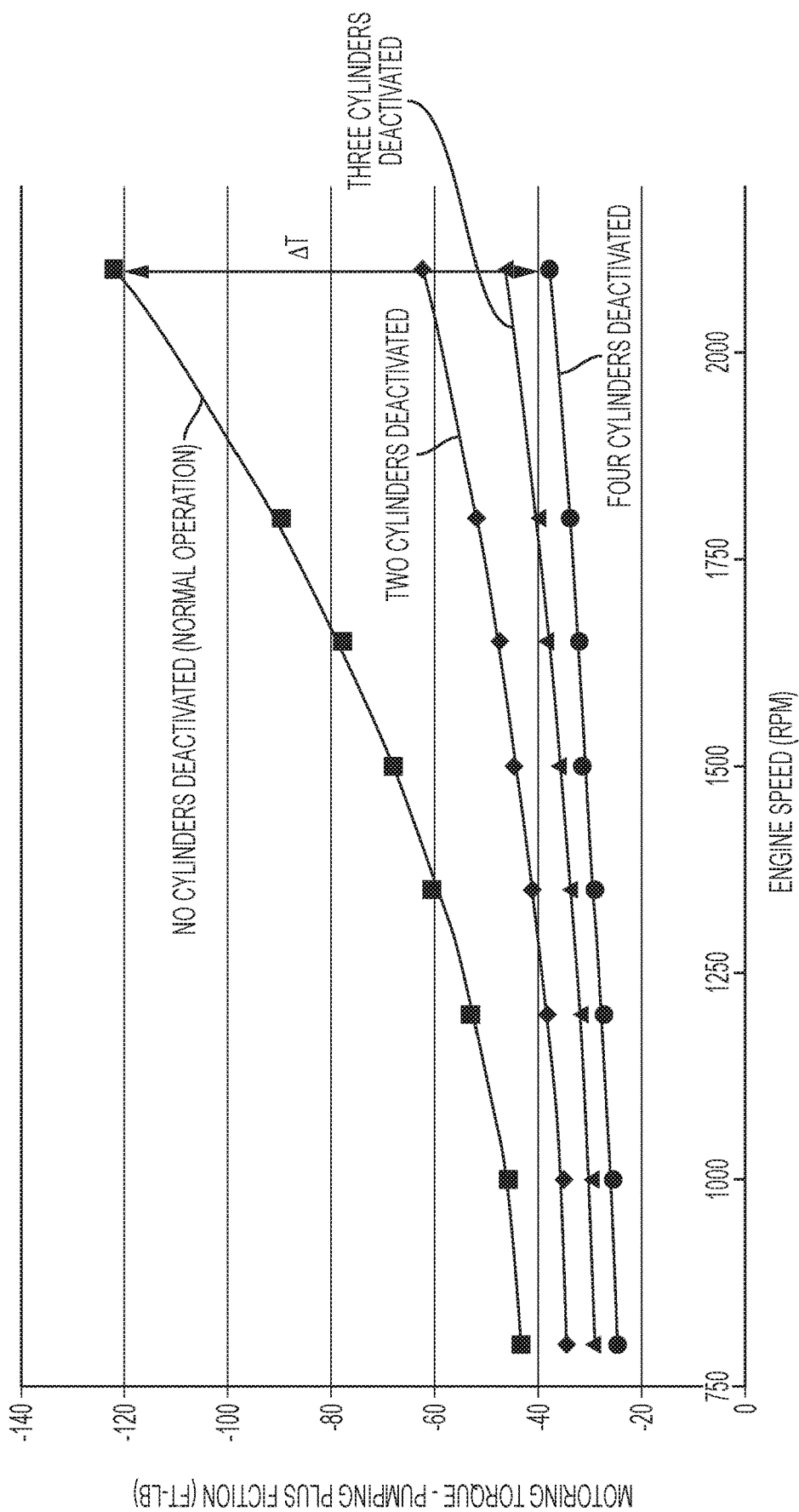
FIG. 12B is a plot showing motoring torque variations caused by friction variations as a function of cylinder deactivation and engine speed.

FIGS. 12A and 12B result in a decision to deactivate one or more cylinders to reduce the torque drain on the crankshaft by reducing the friction caused by active cylinders in the cylinder set. In FIG. 12A, an engine with the pistons removed has crankshaft drive torque contrasted against engine speed in rotations per minute (RPM). With all 6 cylinders active, that is, no cylinder deactivation selections, the torque required turn the crankshaft can be seen on the upper line. Crankshaft torque requirements improve for this engine because the cams are not facing as much resistance on the deactivated cylinders as they are on the active cylinders. As the number of cylinders in the deactivated cylinder set increases, the torque required to move the crankshaft decreases. This means that, in addition to fuel savings from deactivating fuel injection, and in addition to fuel savings from increasing the efficiency of active cylinders, deactivating cylinders increases fuel savings by preventing energy drain on the crankshaft. A Delta Torque $\Delta T$ can be seen at 1700 RPM at engine idle to equal at least 2 foot-pounds of torque saved by moving from 6 active cylinders to 3 active cylinders and 3 deactivated cylinders. Referencing the data of FIG. 12 assists with cylinder deactivation decisions, as control strategies favor maximizing the number of cylinders deactivated in order to minimize the friction between the plurality of cylinders and their respective reciprocating piston assembly by selecting a cylinder combination of active cylinders and deactivated cylinders with the lowest total friction while meeting engine power demand.

FIG. 12B shows test results for a fully assembled engine. Here, motoring torque (the torque required to power the engine without supplying net torque) is contrasted against engine RPMs. Again, the all-active cylinder set requires the most torque output. Deactivating cylinders improves the efficiency of the engine by reducing pumping losses and by reducing friction losses. Fuel economy improves. The Delta Torque $\Delta T$ at 2100 RPMs is about a 70% energy savings to convert from 6 cylinders active to 3 active cylinders and 3 deactivated cylinders.

The principles of FIGS. 12A & 12B can be applied to downhill grades, such as ½% or 1% grades, and an all-cylinders deactivated cylinder set can be selected to conserve fuel and to extend coasting and platooning capabilities. A coasting or platooning vehicle will travel farther as the motoring torque decreases.

Figure 20:
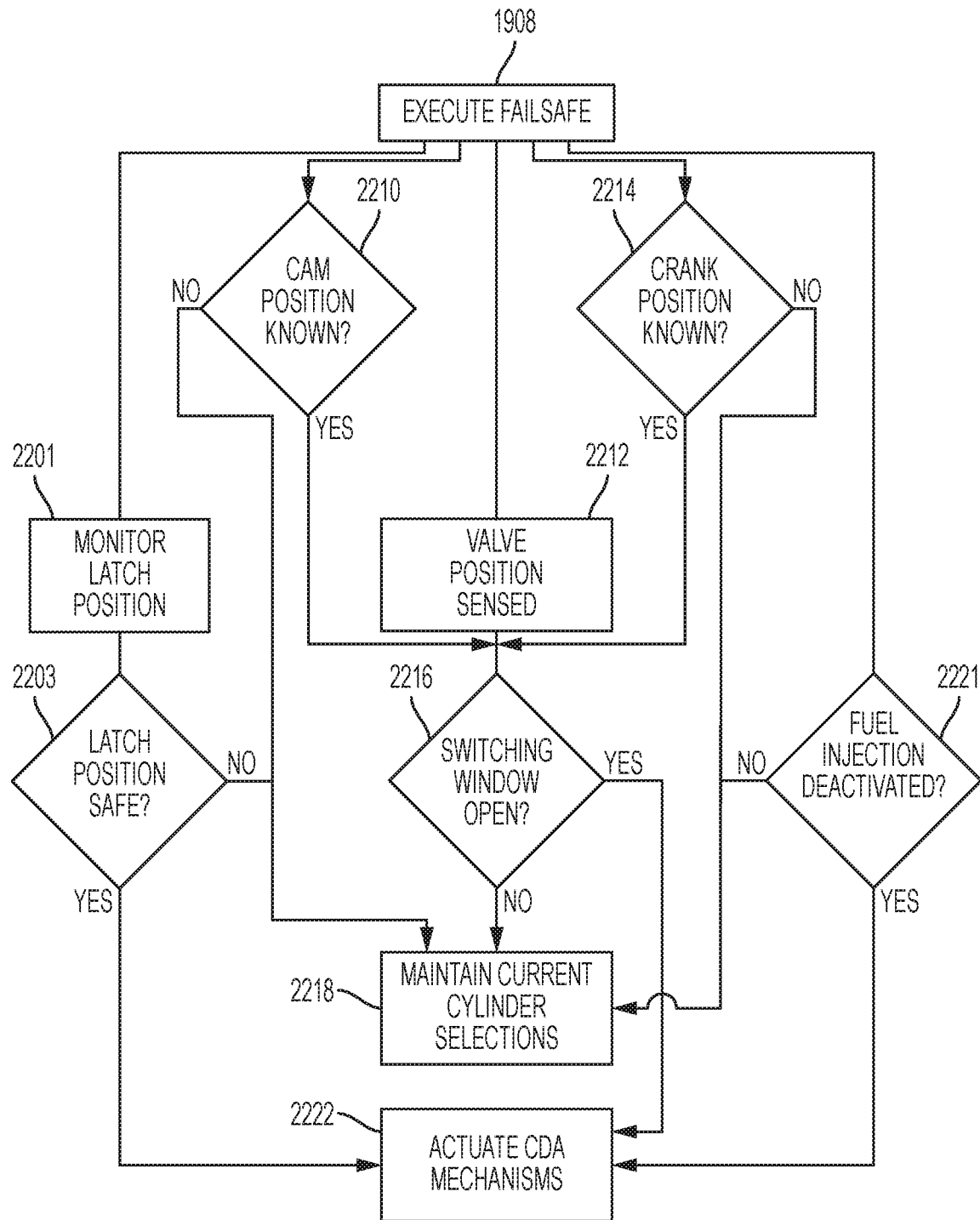
FIG. 20 is an example of a flow diagram for executing failsafe mode and failsafe subroutines.

Several failsafe protocols are outlined in FIG. 20. Executing failsafes in step 1908 can comprise one or more of several decisions and steps. For example, one failsafe subroutine monitors latch position in step 2201. A decision is made as to whether the latch position is safe in step 2203. If not, the current cylinder selections are maintained in step 2218. If the latch position is safe, then the CDA mechanisms are actuated in step 2222.

In another stream, if the cam position is known, and a switching window is open, then step 2222 can be executed. Step 2210 can be combined with valve position sensing in step 2212 and crank position decisions in step 2214, or each step can be a separate failsafe subroutine. Positive results to steps 2214 and 2212 lead to a switching window determination. If the switching window is open, then CDA mechanisms are actuated in step 2222, but if the switching window is closed, then the current cylinder selections are maintained in step 2218.

In another stream, a failsafe subroutine checks if fuel injection has been deactivated in step 2221. Alternatively, the failsafe subroutine comprises the step of determining whether the injection controller has injected fuel in to any one of the determined number of deactivated cylinders. Or, the failsafe subroutine comprises the step of determining whether the injection controller has received the command to deactivate the determined number of cylinders. A negative result leads to step 2218, while a positive result leads to step 2222.

An additional failsafe subroutine can comprise the CDA controller 1800 confirming that the respective intake valves and the respective exhaust valves have been deactivated for the determined number of cylinders.

Static CDA mode can be arranged so that a common rail supplies actuation to designated cylinders in a rigid manner. The rail is either on or off. For example the pair of OCVs OCV1 & OCV2 are always actuated together. Alternatively, dynamic CDA mode permits one or both of OCV1 and OCV2 to be actuated. If all cylinders have cylinder deactivation mechanisms, such that the engine system further comprises at least one cylinder deactivation unit for each of the plurality of cylinders, then all of the cylinders can use CDA mode, and the pattern of CDA can change around the engine over time.

In another aspect, determining a number of cylinders results in a combination of active cylinders and deactivated cylinders where more than half of the plurality of cylinders are deactivated cylinders. Alternatively, only one of the plurality of cylinders is a deactivated cylinder. Also, it is possible that determining a number of cylinders comprises selecting among the options of one deactivated cylinder, two deactivated cylinders, or three deactivated cylinders. And, half of the plurality of cylinders can be deactivated cylinders In a further aspect, the engine system can comprise a load monitoring sensor. At least one set of control algorithms is configured to receive load data, determine a load on the engine, and determine an engine output requirement based on the load on the engine. When a load on the engine is below a first threshold, it is possible to adjust the number of the plurality of cylinders selected for deactivation to meet engine output requirements. When a load on the engine is above the first threshold, the control algorithm can be further configured to deselect the at least one of the plurality of cylinders selected for deactivation, command the injection controller to activate the respective fuel injector for the at least one of the deselected cylinders, command the intake valve controller to activate the respective intake valve for the at least one of the deselected cylinders, and command the exhaust valve controller to activate the respective exhaust valve controller for the at least one of the deselected cylinders.

When the engine system comprises an intake assisting device and an air flow sensor, the at least one set of control algorithms is further configured to receive air flow data, determine an air flow amount to the respective intake valves, and determine an air fuel ratio for each of the plurality of cylinders based on the determined air flow amount and based on the fuel injector commands. Based on the determined air fuel ratio, the intake assisting device is commanded to increase air flow to the plurality of cylinders when the load on the engine is within a predetermined range. Alternatively, based on the determined air fuel ratio, it is possible to adjust commands to the fuel injector to adjust the quantity of fuel injected to active cylinders of the plurality of cylinders.

A method for operating a multiple cylinder engine system in a cylinder deactivation mode can comprise determining that the engine system is operating within at least one threshold range. The method selects a number of cylinders of the multiple cylinder engine to deactivate. A failsafe operation is executed to confirm a latch position of a deactivation mechanism. Then, the system enters cylinder deactivation mode in the selected number of cylinders. Entering cylinder deactivation mode comprises deactivating fuel injection to the selected number of cylinders and deactivating intake valve actuation and exhaust valve actuation to the selected number of cylinders.

A method for operating a multiple cylinder engine system in a cylinder deactivation mode, can comprise determining that the engine system is operating within at least one threshold range, the at least one threshold range comprising an engine power demand. A friction determination is executed to minimize friction between a plurality of cylinders and their respective reciprocating piston assemblies. The method comprises selecting a cylinder combination of active cylinders and deactivated cylinders with the lowest total friction, based on the friction determination, while meeting the engine power demand. Selecting the number of cylinders of the multiple cylinder engine to deactivate can be based on minimizing friction between respective piston assemblies and respective cylinder walls of the selected number of cylinders.

The method for the friction determination can comprise accessing sensed or stored friction values for the multiple cylinder engine system. And, The method can comprise distributing the active cylinders and deactivated cylinders around the multiple cylinder engine system to minimize total friction between the plurality of cylinders and their respective reciprocating piston assemblies. The distribution and number of cylinders can be updated iteratively based on updated engine power demand data and based on updated friction determinations. The distribution of active cylinders and deactivated cylinders can be adjusted so that, over time, the number and location of active cylinders and deactivated cylinders varies for the multiple cylinder engine system.

Executing a friction determination can further comprise executing a cam friction determination to minimize friction between one or more rotating cam lobes and one or more valve actuation mechanisms.

It is possible to monitor an engine crankshaft speed, and to set at least one threshold range for entering or exiting CDA mode, with the threshold ranges broken in to a high speed threshold range and a low speed threshold range. The cylinder combination can be adjusted based on whether the engine crankshaft speed is within the high speed threshold range or the low speed threshold range. It is also possible to monitor an engine operating mode comprising a start-up mode. The at least one threshold range can comprise the start-up mode. The threshold can alternatively be a subset of monitored accelerator positions, or another user input, such as a switch selection or "button up" or "button down" command.

Other implementations will be apparent to those skilled in the art from consideration of the specification and practice of the examples disclosed herein.

What we claim:

1. A diesel engine system, comprising:
    a selectively actuated cylinder deactivation mechanism configured to lift and lower a valve and to deactivate actuation of the valve, comprising:
        a sleeve comprising recesses; and
        a controllable latch movable between a latched condition to catch the controllable latch in the recesses and an unlatched condition configured to collapse the controllable latch from the recesses;
    a pushrod coupled to the sleeve, the pushrod configured to lift and lower the valve when the controllable latch is in the latched condition, the pushrod further configured to reciprocate inside the sleeve to deactivate actuation of the valve when the controllable latch is in the unlatched condition;
    a cam lobe configured to rotate among a base circle position and a lift position to reciprocate the sleeve between lowered and lifted; and
    a cylinder deactivation controller configured to run a failsafe subroutine to restrict oil control valve command signals to move the controllable latch between the latched condition and the unlatched condition to a time period between when the cam lobe has begun lifting the sleeve and when the cam lobe has returned to base circle.

2. The diesel engine system of claim 1, further comprising a lash adjuster in the sleeve between the pushrod and the controllable latch.

3. The diesel engine system of claim 2, wherein the lash adjuster is a hydraulic lash adjuster.

4. The diesel engine system of claim 3, wherein the lash adjuster comprises a lash housing surrounding at least one fluid chamber, wherein the lash housing comprises one or more latch cavities, and wherein the controllable latch is integrated in the one or more latch cavities in the lash housing.

5. The diesel engine system of claim 4, further comprising:
- an oil port through the sleeve for fluidly communicating with the one or more latch cavities;
- a bearing seated in the sleeve beneath the controllable latch; and
- a leakdown port fluidly connected to the one or more latch cavities and configured for fluidly communicating an amount of fluid to the bearing.

6. The diesel engine system of claim 1, wherein the controllable latch is biased by a spring to catch in the recesses and wherein the controllable latch overcomes a spring force of the spring to collapse from the recesses.

7. The diesel engine system of claim 6, wherein the controllable latch comprises a face, wherein the recesses comprise a cavity, and wherein the sleeve comprises an oil port.

8. The diesel engine system of claim 7, further comprising an oil control valve for fluidly communicating oil pressure with the oil port to direct oil pressure in to into the cavity and against the face.

9. The diesel engine system of claim 8, wherein the oil control valve controls the oil pressure to move the controllable latch between the latched condition and the unlatched condition.

10. The diesel engine system of claim 8, further comprising a communication circuit for providing a command signal to the oil control valve to selectively move the controllable latch between the latched condition and the unlatched condition.

11. The diesel engine system of claim 6, further comprising a capacitive device in an oil control valve control rail configured to store a portion of energy from the command signal to reduce energy waste in the diesel engine system and to decrease response time of a subsequent command signal issued by the communication circuit.

12. The diesel engine system of claim 1, further comprising one of an intake valve or an exhaust valve coupled to a rocker arm, the rocker arm coupled to the pushrod.

13. The diesel engine system of any one of claim 1, further comprising a bearing seated on an axle in the sleeve and the cam lobe is configured to rotate against the bearing to lift and to lower the sleeve.

14. The diesel engine system of claim 13, wherein the controllable latch is configured with edges that are configured to clamp in the recesses when the controllable latch is in the latched condition and when the cam lobe rotates to lift the sleeve.

15. The diesel engine system of claim 14, wherein, when the controllable latch is in the latched condition and the edges are clamped in the recesses, the system further comprises a deactivation signal to select the unlatched condition.

16. The diesel engine system of claim 13, wherein the time period is restricted to between when the cam lobe has begun lifting the sleeve and when the cam lobe has fully lowered the sleeve.

17. The diesel engine system of claim 1, further comprising a crown in the sleeve between the pushrod and the controllable latch, the crown comprising a metered port configured to lubricate the pushrod.

18. The diesel engine system of claim 1, further comprising:
- a hydraulic lash adjuster in the sleeve comprising a lash housing and a first chamber in the lash housing;
- a crown in the lash housing to cap pressurized hydraulic fluid within the first chamber, wherein the pushrod seats on the crown.

19. A diesel engine system, comprising:
- a selectively actuated cylinder deactivation mechanism configured to lift and lower a valve and to deactivate actuation of the valve, comprising:
  - a sleeve comprising recesses;
  - a controllable latch movable by a command signal to an oil control valve control rail between a latched condition to catch the controllable latch in the recesses and an unlatched condition configured to collapse the controllable latch from the recesses; and
  - a pushrod coupled to the sleeve, the pushrod configured to lift and lower the valve when the controllable latch is in the latched condition, the pushrod further configured to reciprocate inside the sleeve to deactivate actuation of the valve when the controllable latch is in the unlatched condition;
- a capacitive device in the oil control valve control rail configured to store a portion of energy from the command signal to reduce energy waste in the diesel engine system and to decrease response time of a subsequent command signal; and
- a controller unit connected to the oil control valve control rail configured to maximize use of the stored command signal energy by repeatedly selecting an oil control valve so as to provide subsequent signals to the oil control valve thereby selectively moving the controllable latch between the latched condition and the unlatched condition.

20. A method of controlling a cylinder deactivation mechanism, comprising:
- executing a valve lift event configured to lift a valve via a pushrod and rocker arm combination, wherein the pushrod is coupled via a sleeve with a controllable latch in a latched condition, wherein the controllable latch is configured with edges that are clamped in recesses of the sleeve during the valve lift event, a clamp force supplied in part by pressure from the pushrod;
- sending a deactivation signal to select the unlatched condition to collapse the controllable latch from the recesses while the controllable latch is configured in the valve lift event with edges that are clamped in recesses of the sleeve; and
- deactivating actuation of subsequent valve lift events by collapsing the controllable latch from the recess once the valve lift event is complete and the clamp force supplied in part by pressure from the pushrod diminishes.

* * * * *